United States Patent [19]
Groves et al.

[11] Patent Number: 5,959,848
[45] Date of Patent: Sep. 28, 1999

[54] LOW INDUCTANCE HIGH CURRENT CONNECTOR FOR IMPROVED POWER SUPPLY SYSTEM

[75] Inventors: John Michael Groves, Kwai Chung; Wing Ling Cheng, Tai Po; Man Keung Tse, Tsuen Wan; Shu Chung Wong, Kowloon, all of The Hong Kong Special Administrative Region of the People's Republic of China

[73] Assignee: Astec International Limited, The Hong Kong Special Administrative Region of the People's Republic of China

[21] Appl. No.: 08/840,349

[22] Filed: Apr. 28, 1997

Related U.S. Application Data

[63] Continuation of application No. 08/819,529, Mar. 17, 1997.

[51] Int. Cl.$^6$ ................ H05K 7/02; H01R 9/09
[52] U.S. Cl. .............. 361/809; 361/809; 361/760; 439/74; 439/660; 439/924.1
[58] Field of Search ............ 307/150; 361/606, 361/760, 785–791, 807–810, 825, 829, 831; 439/60, 74, 83, 660, 101, 924.1

[56] References Cited

U.S. PATENT DOCUMENTS

| | | | |
|---|---|---|---|
| 3,673,545 | 6/1972 | Rundle | 439/660 |
| 5,295,843 | 3/1994 | Davis et al. | 439/924.1 |
| 5,311,397 | 5/1994 | Harshberger et al. | 361/683 |
| 5,349,132 | 9/1994 | Miller et al. | 174/35 |
| 5,396,401 | 3/1995 | Nemoz | 361/690 |
| 5,402,312 | 3/1995 | Kinjo et al. | 361/695 |

OTHER PUBLICATIONS

*Noren Heat Pipes*—Product Description, Noren Products, Inc. (4 pgs.) No known date.

*Primary Examiner*—Gregory Thompson
*Attorney, Agent, or Firm*—Coudert Brothers

[57] ABSTRACT

A power connector for coupling a power supply to an integrated circuit (IC) whose current requirements may vary abruptly over time to a power supply is disclosed. The male connector comprises parallel conductive plates separated by a thin sheet of insulation. A mounting structure positions the power supply a predefined distance above the surface of a PC board upon which is disposed the IC. The male connector is electrically coupled to the IC and mates with a female connector attached to the power supply. The parallel plate male connector improves the ability of the power supply to accomodate abrupt changes in the current requirements of the IC by several different mechanisms. First, voltage oscillations associated with abrupt changes in the current requirements of the IC are reduced by selecting the inductance of the male connector to be low, which corresponds to a comparatively wide width of the conductive plates and a comparatively thin insulation thickness separating the plates. Second, the high frequency resistance of the connector is also reduced by selecting comparatively wide plates. Third, the coupling of high frequency current components produced by abrupt changes in IC current requirements is improved by selecting the characteristic transmission line impedance of the connector to be matched to the IC or to the chip.

20 Claims, 26 Drawing Sheets

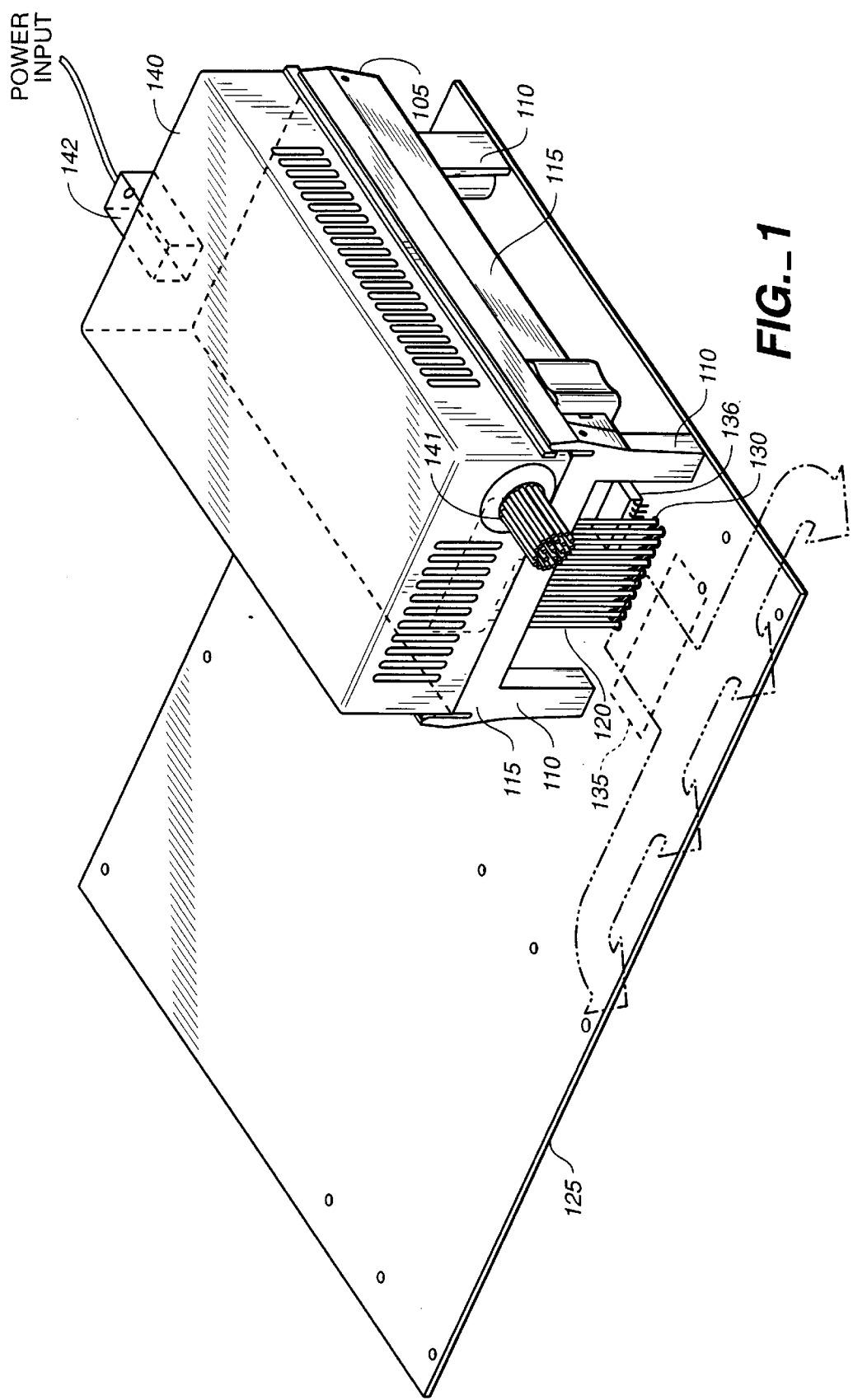
FIG._1

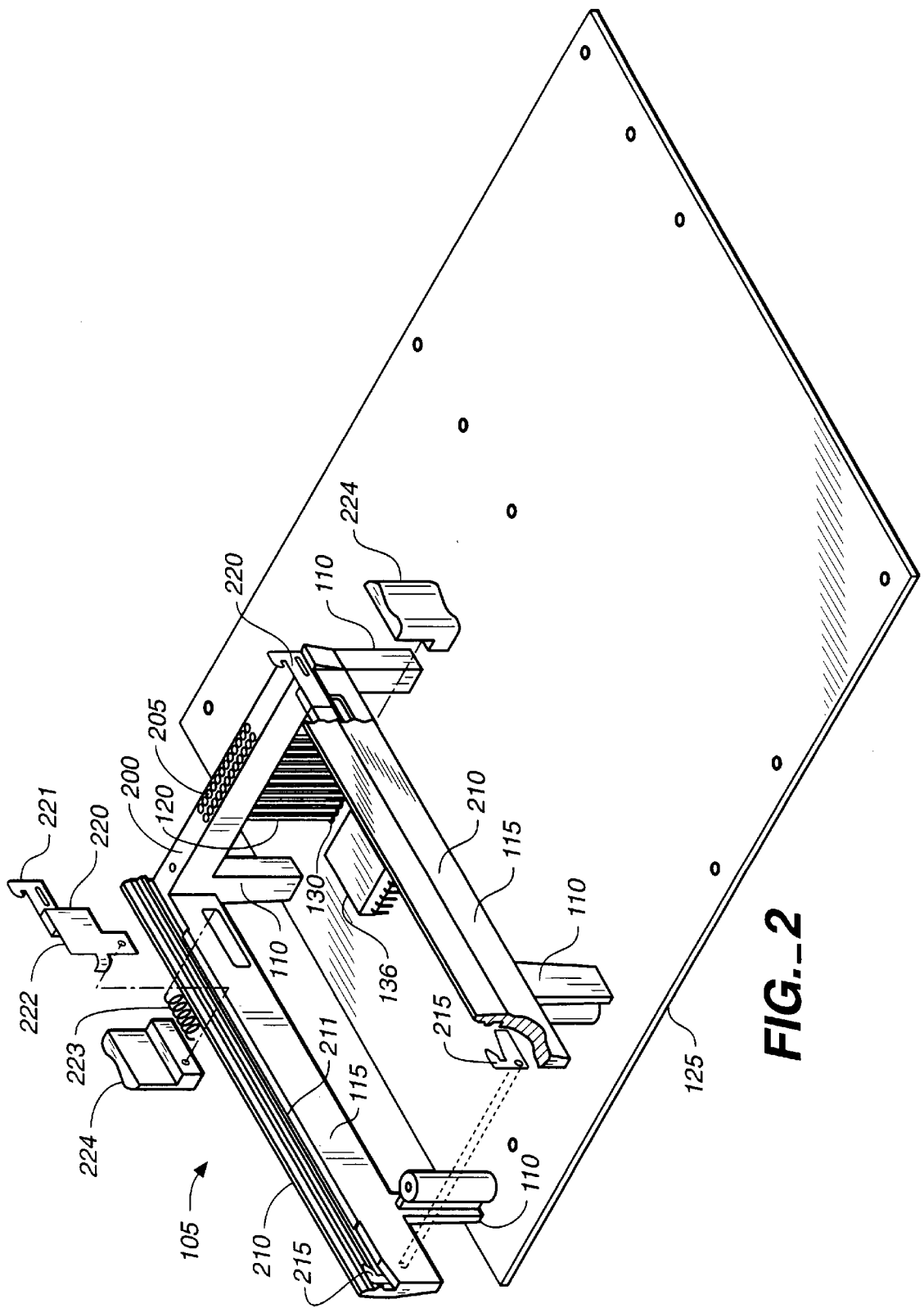
FIG._2

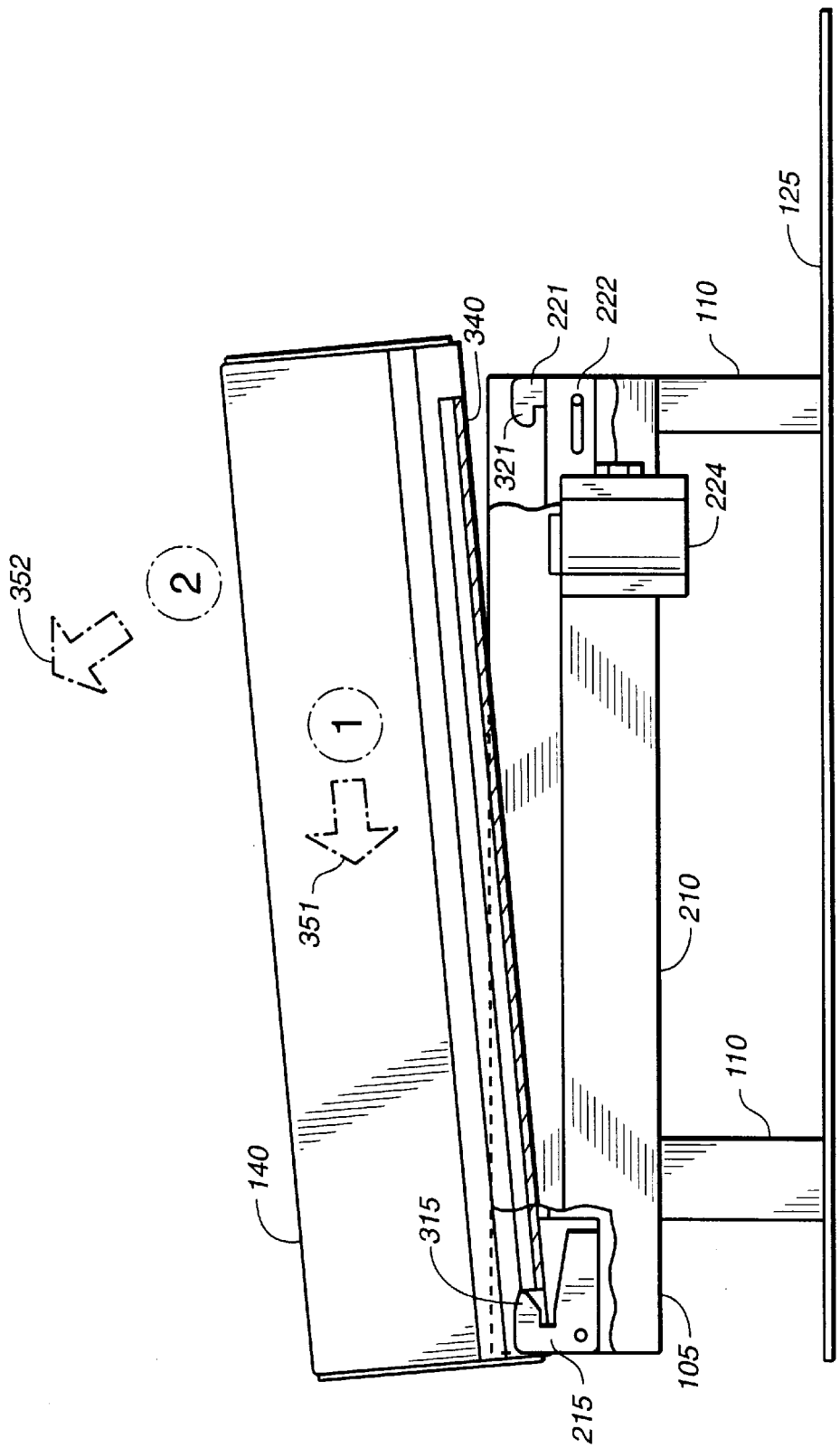
FIG._3

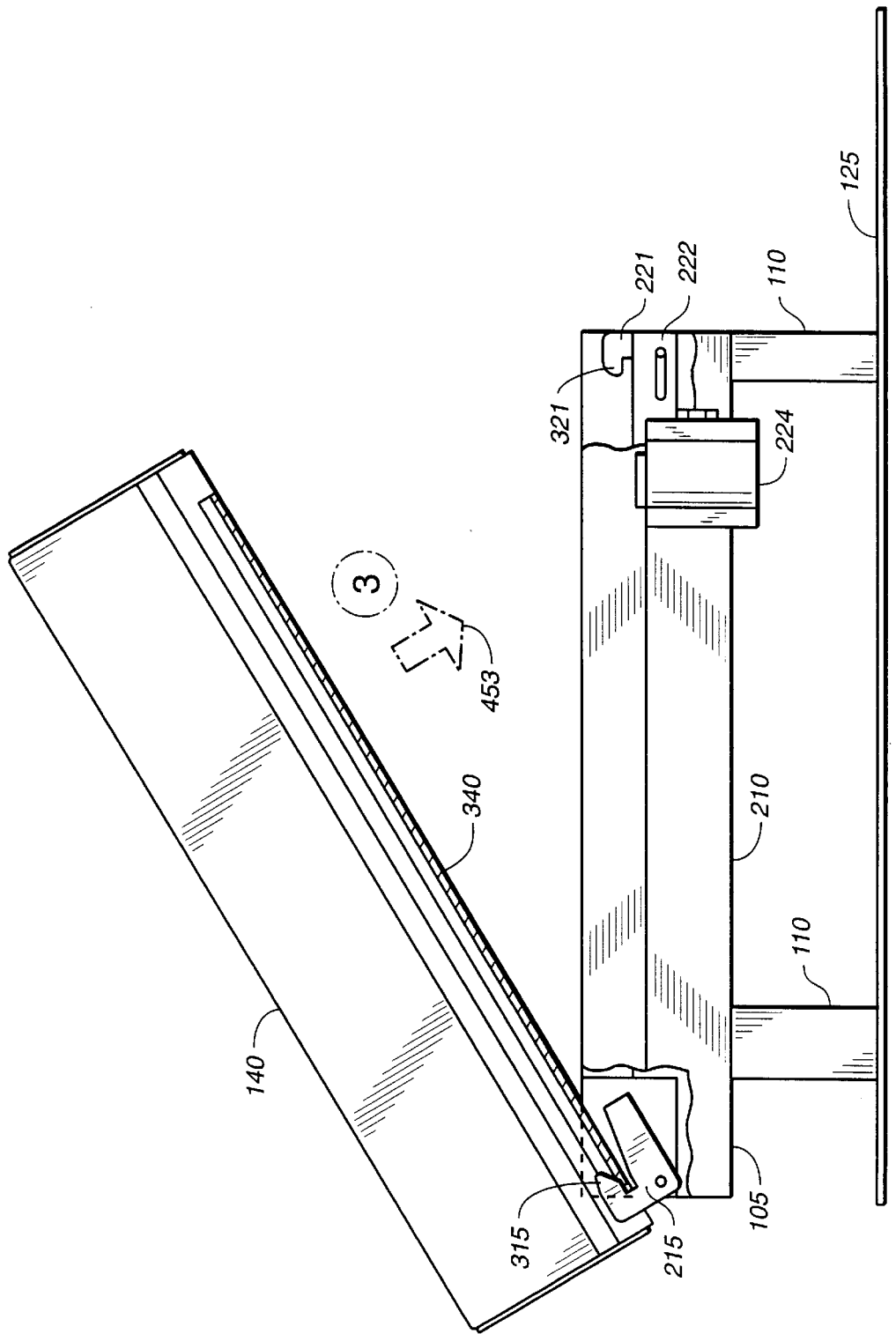

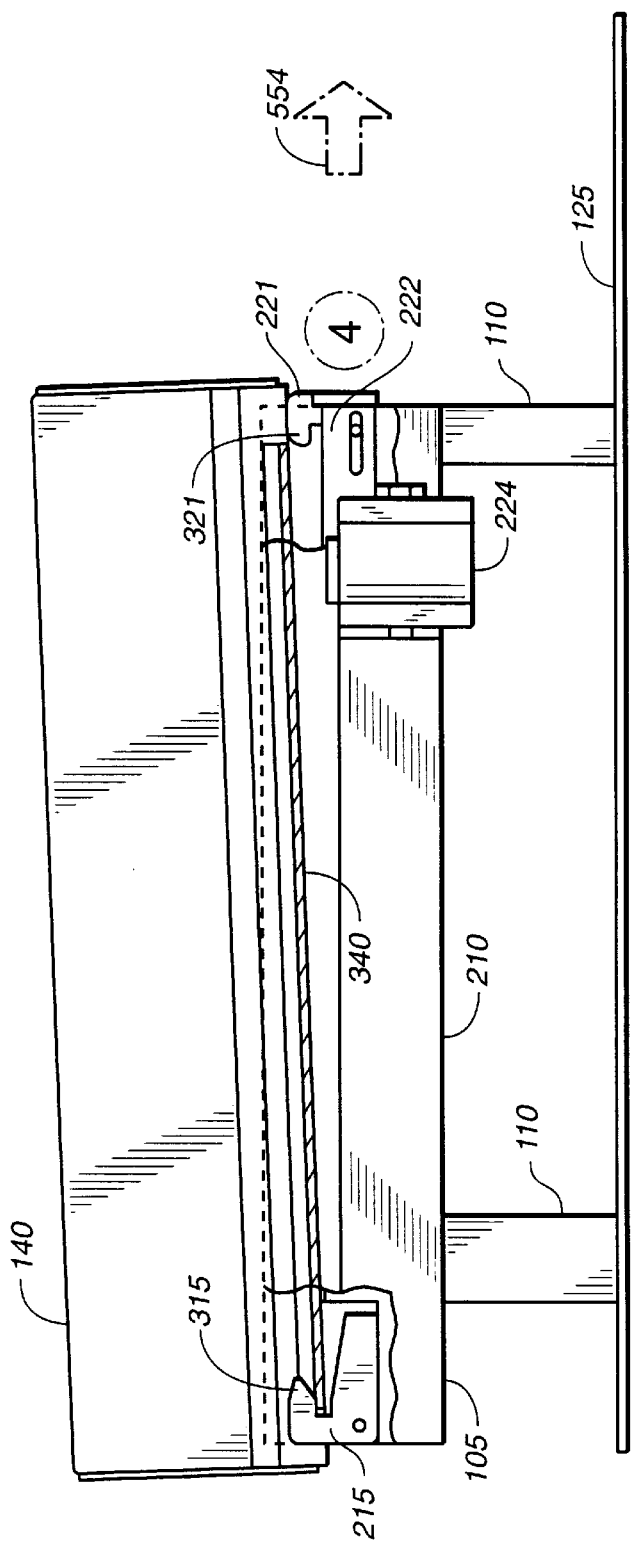
FIG._5

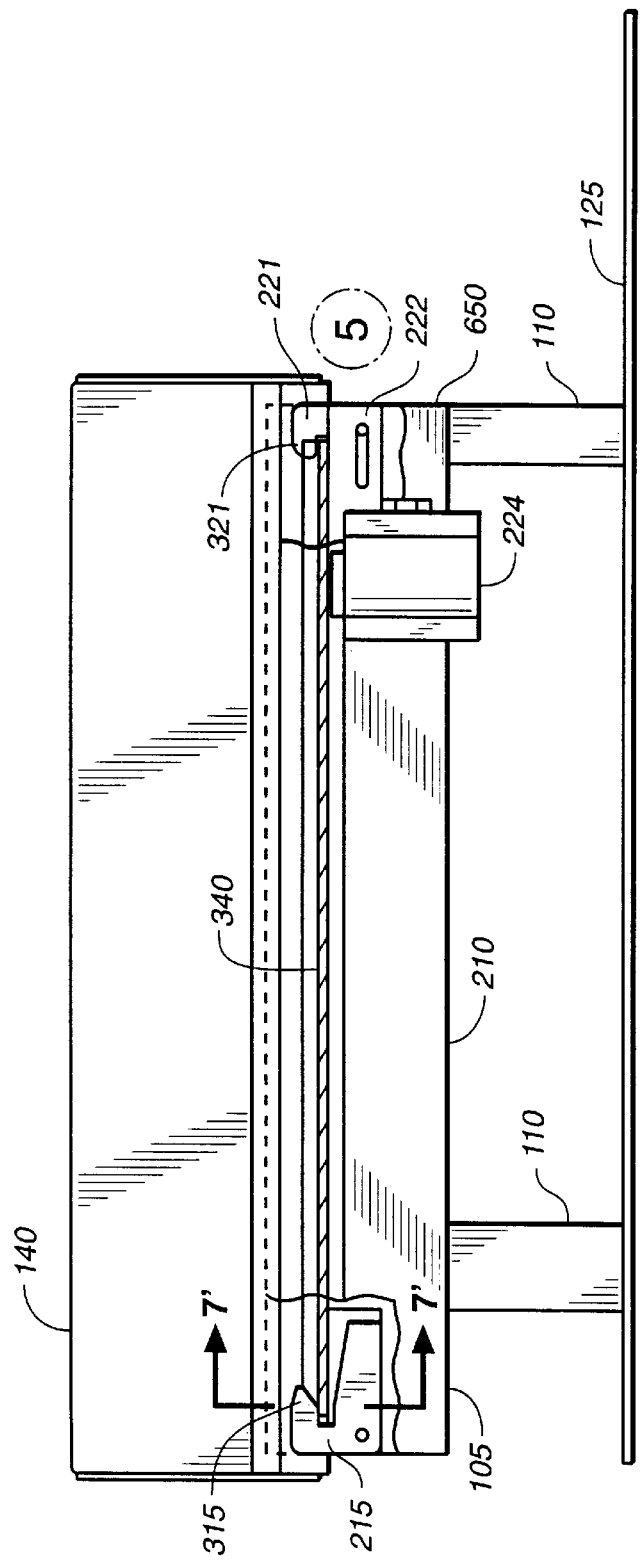
FIG._6

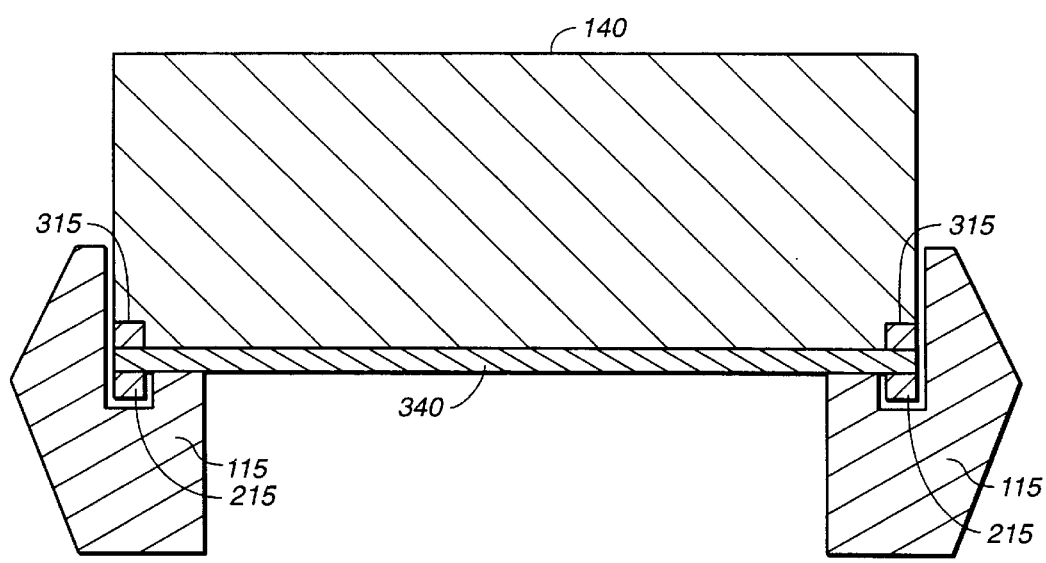
FIG._7

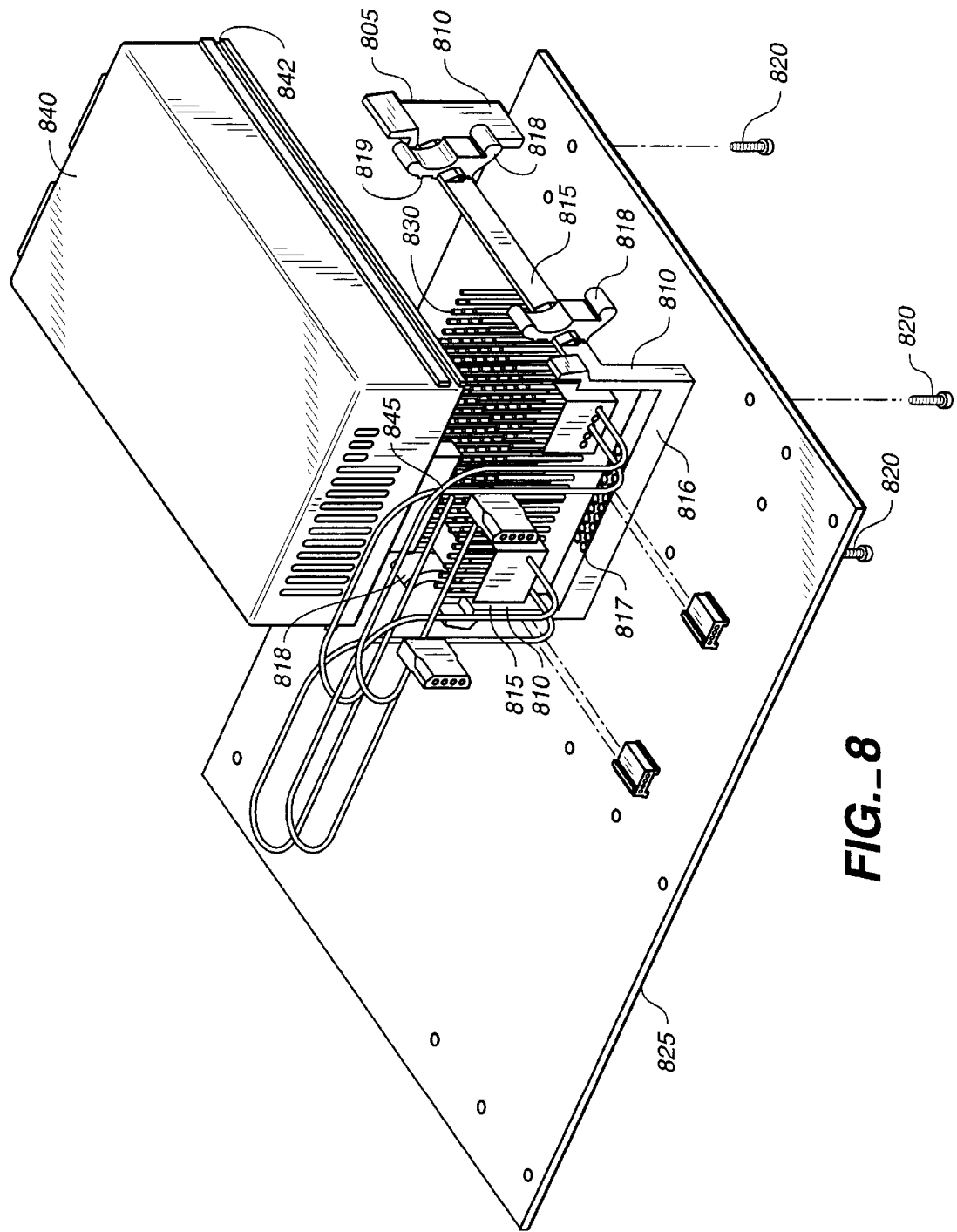
FIG._8

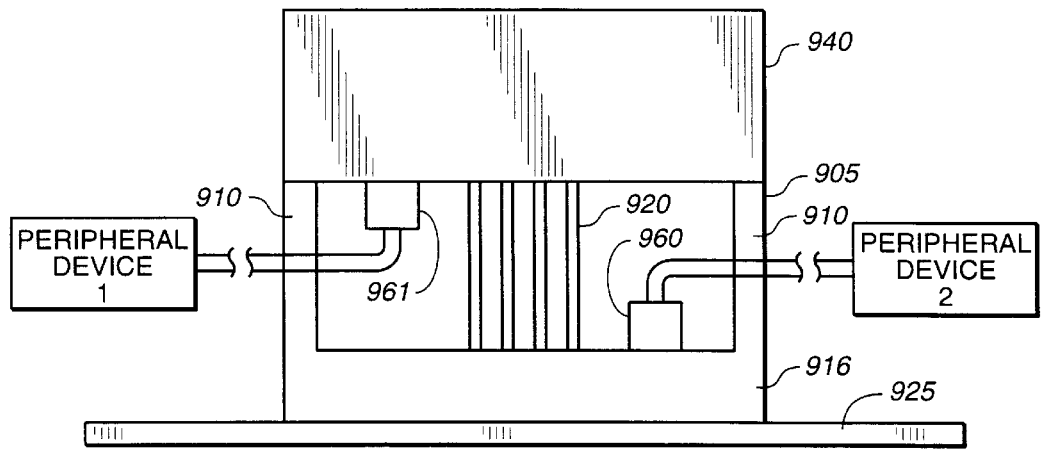
FIG._9
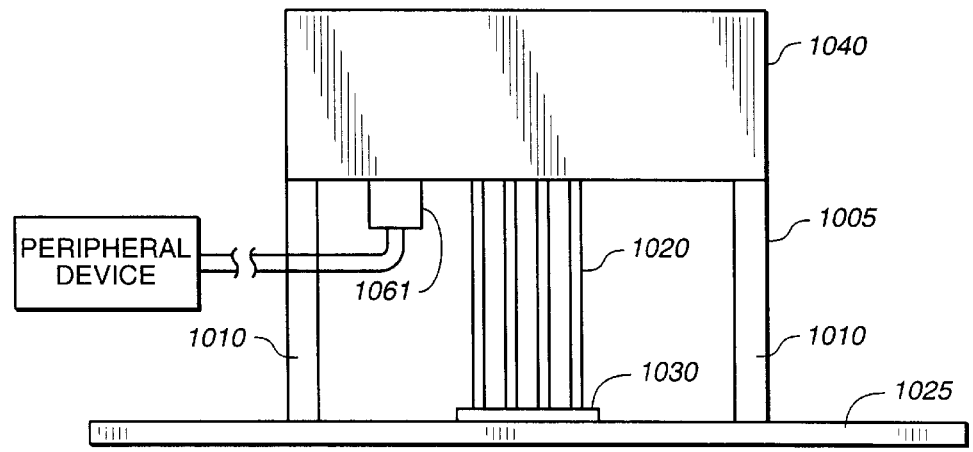
FIG._10

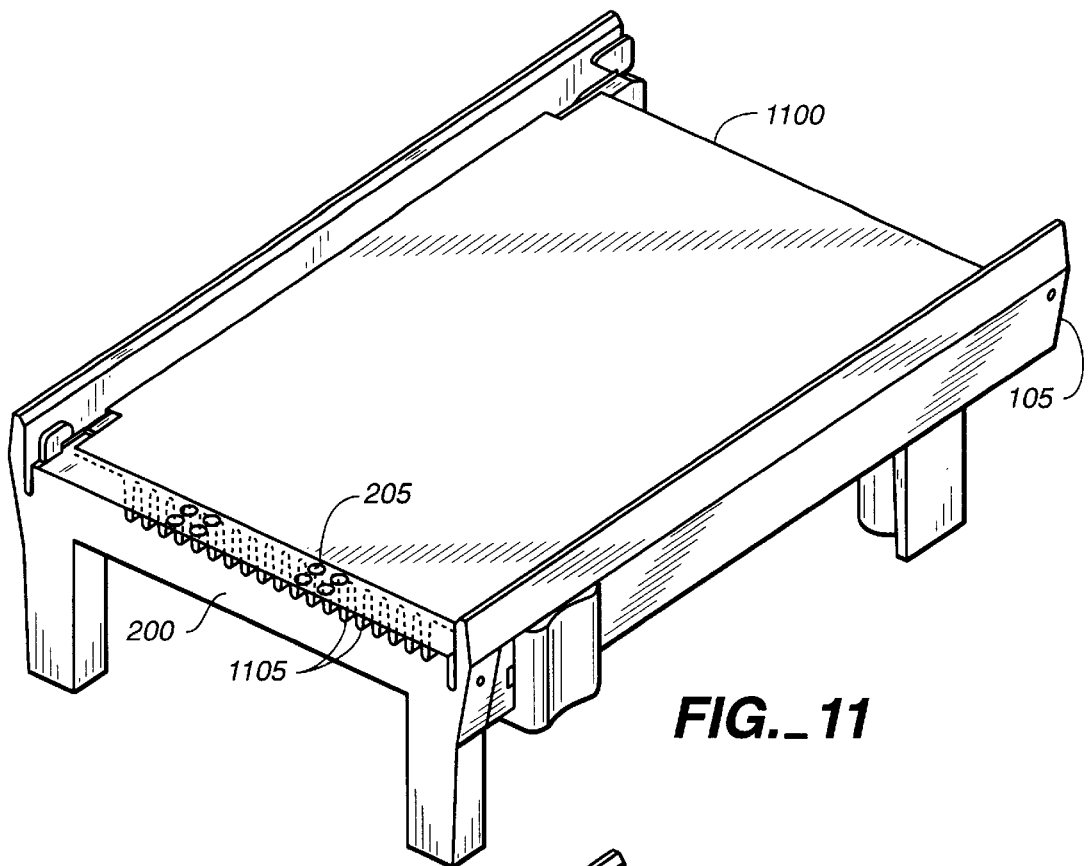
FIG._11
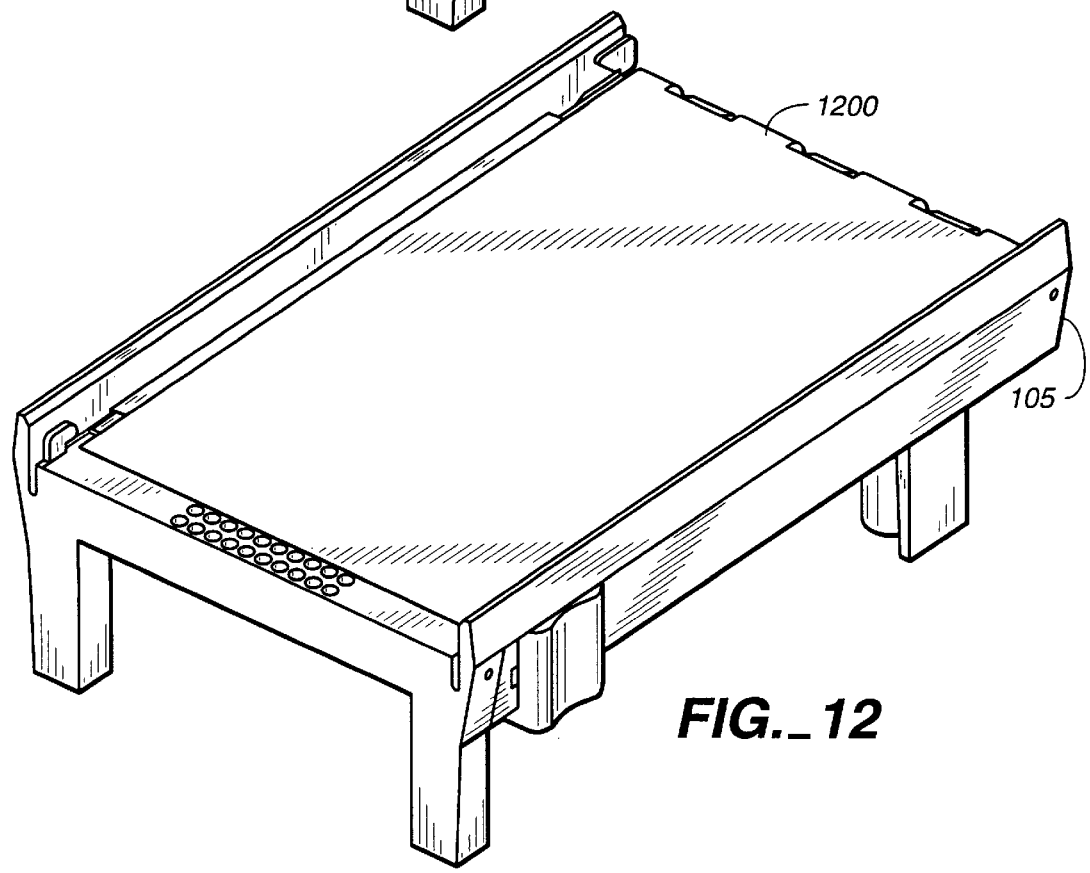
FIG._12

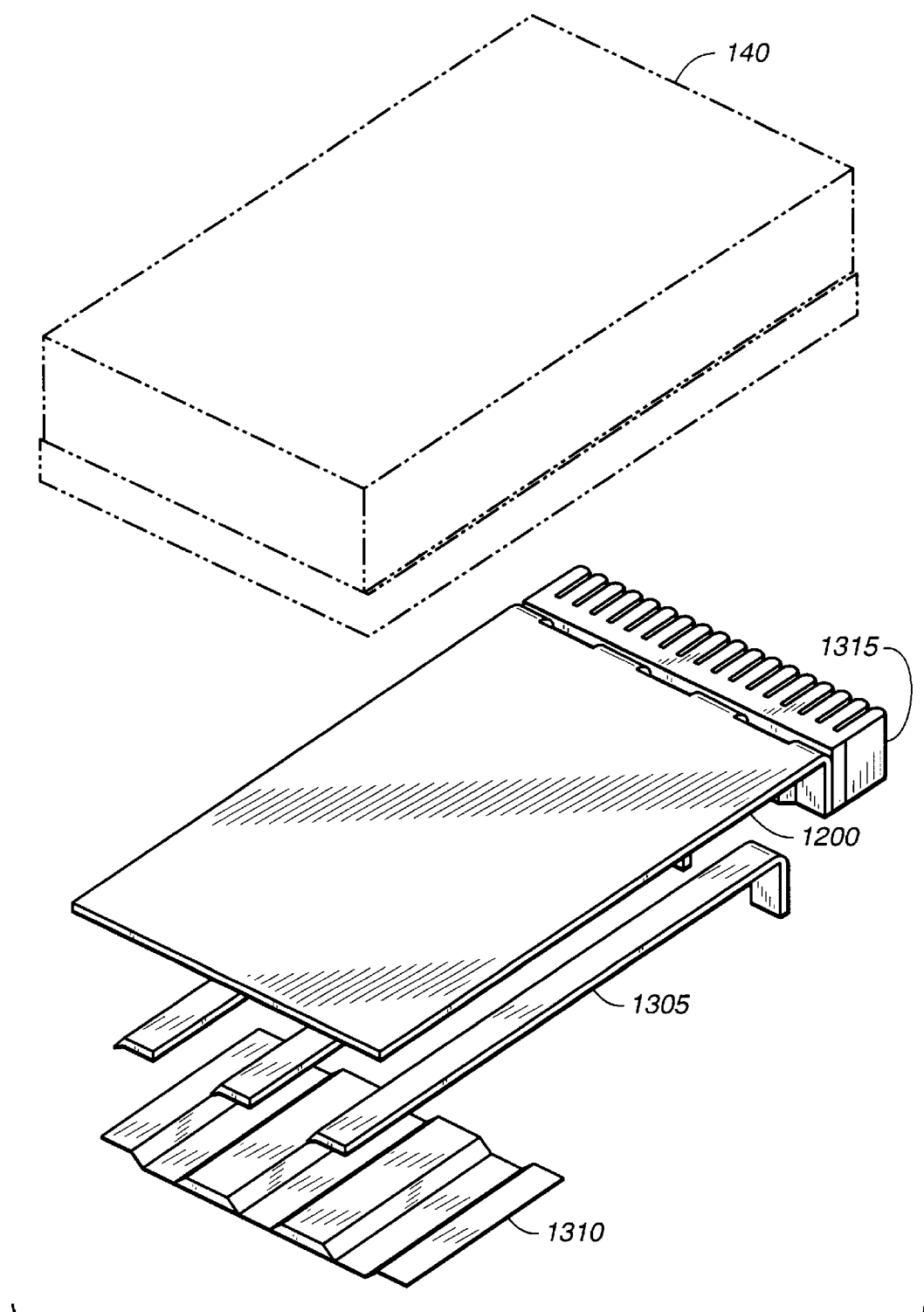
FIG._13

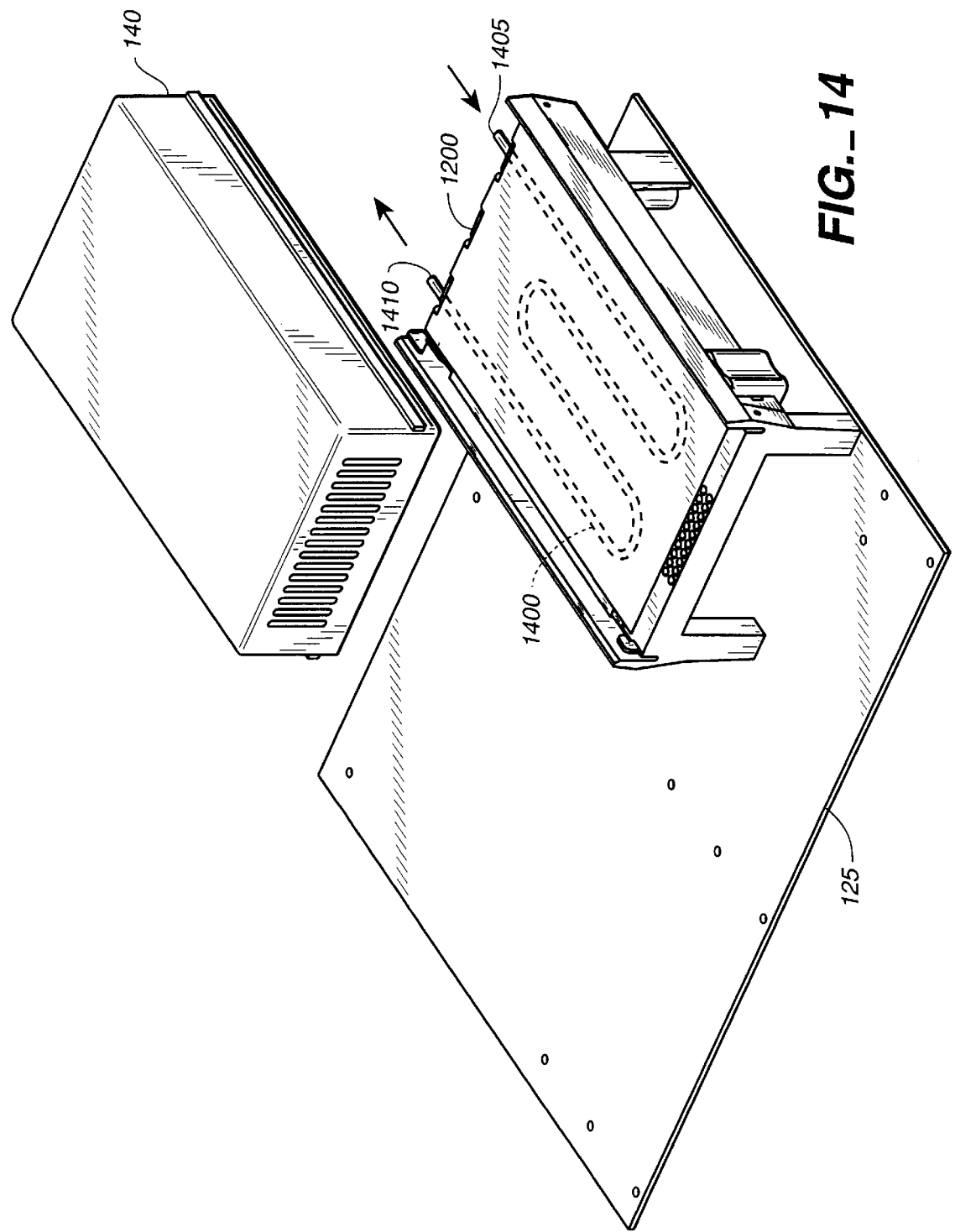

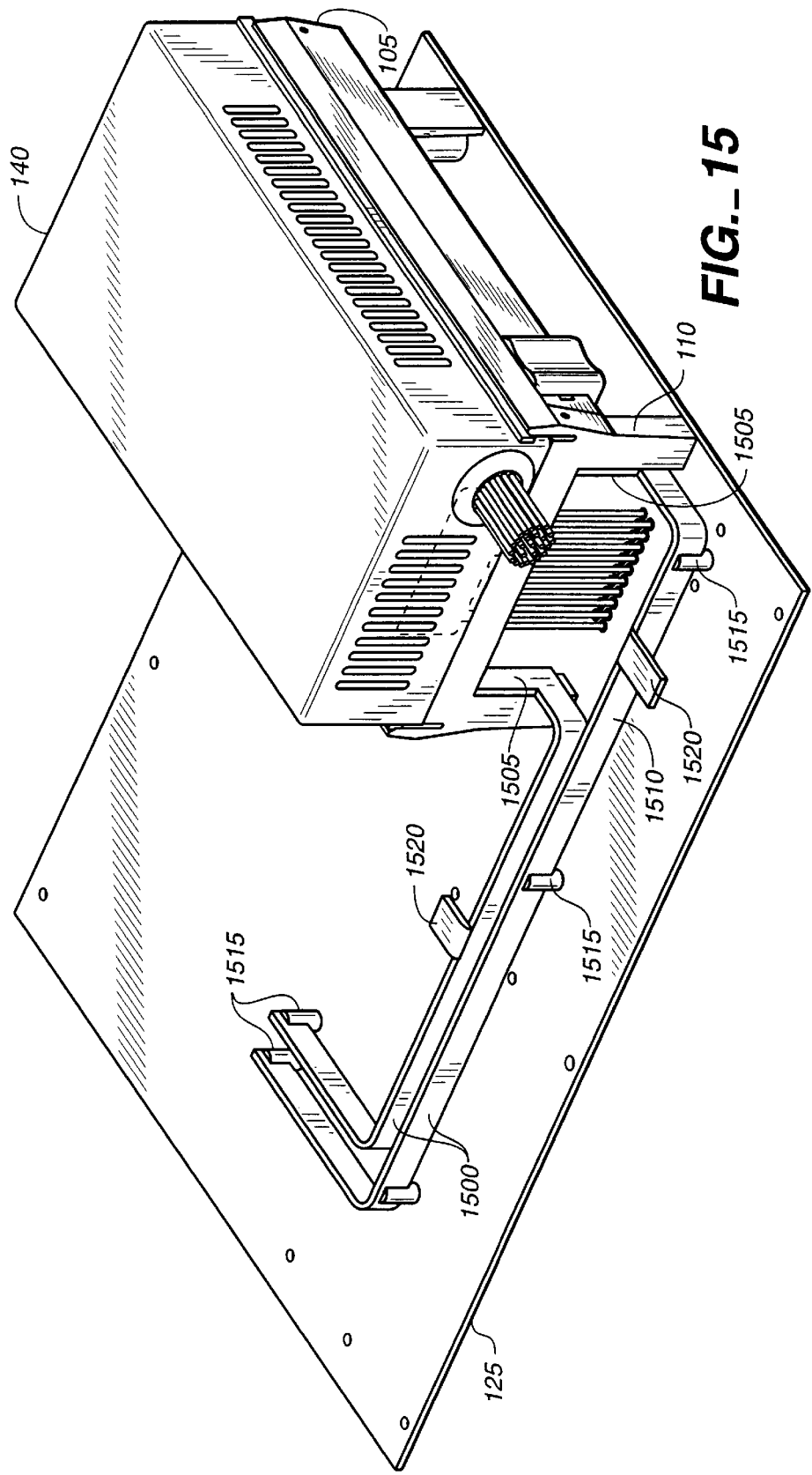

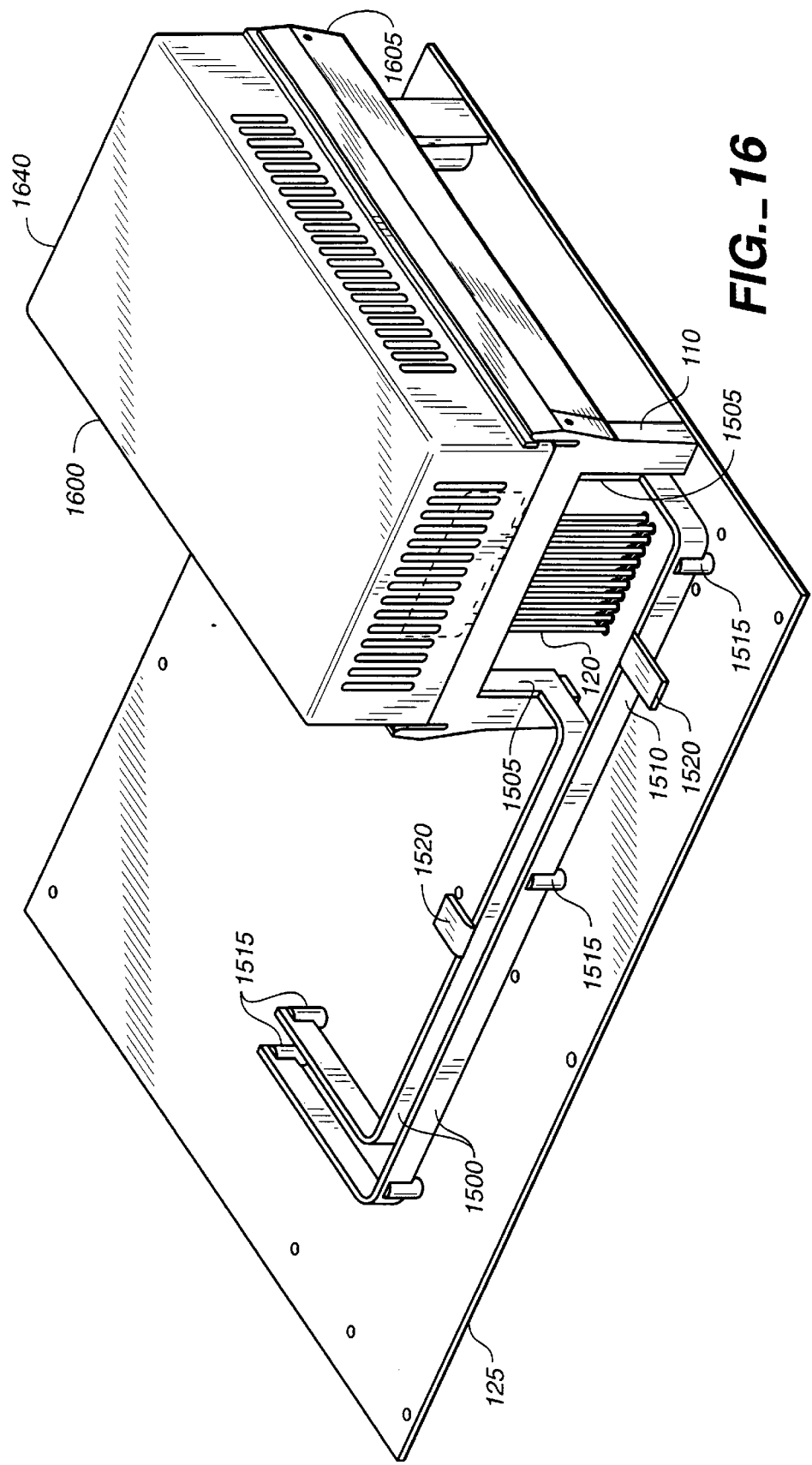

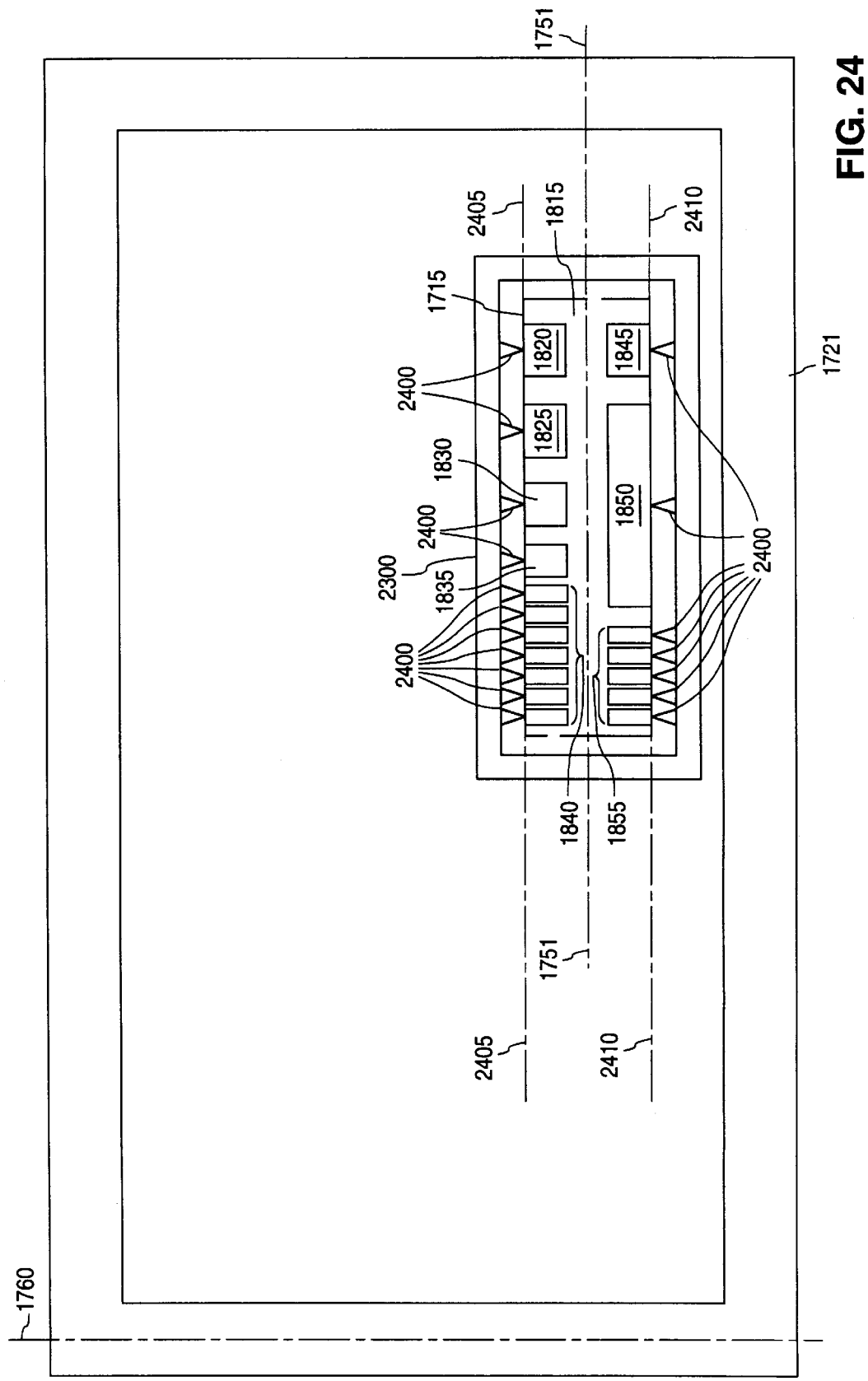

5,959,848

LOW INDUCTANCE HIGH CURRENT CONNECTOR FOR IMPROVED POWER SUPPLY SYSTEM

RELATED APPLICATIONS

This is a continuation in part of U.S. patent application Ser. No. 08/819,529, filed on Mar. 17, 1997.

BACKGROUND OF THE INVENTION

The present invention relates to power supply systems. More specifically, the present invention relates to a power supply mounting system for a high density printed circuit board.

All alternating current (AC) powered electronic equipment contain one or more power supplies to convert the AC input power to various lower direct current (DC) voltages needed by the circuits inside the equipment. In the prior art, a typical connection of power from the power supply to a printed circuit board on which various components such as integrated circuits (IC's) are mounted is by a wire harness. One or more printed circuit boards and peripheral devices have power coupled to them in this manner. In today's complex computers, a single large multilayer printed circuit board is usually included, a so called motherboard, and one or more large IC's including the microprocessor chip and various memory chips are mounted on this motherboard. Use of a wire harness to couple the power supply to a component on the motherboard has severe limitations as there are significant resistive losses and inductive effects in the wires of the wire harness and conductors in the multi-layer printed circuit board (PCB). As is known in the art, resistive losses are largely determined by the amount of current in a wire or conductor. Similarly, inductive effects are largely determined by the rate at which current through a wire changes and the length of the wire. Accordingly, the resistive losses and inductive effects are significant in a wire or conductor that delivers power to an IC chip or other component that has a high power demand, especially where the active component operates at a low voltage and has a wide ranging and rapidly changing current demand.

Unfortunately, from the perspective of resistive losses and inductive effects, most modern day microprocessors have a high power demand, a low operating voltage, and a wide ranging and rapidly changing current demand. For example, the Intel Pentium Pro microprocessor operates at 3.1 volts and has a current demand that can change from 0 to 11.2 amps in 350 nanoseconds. It is expected that future microprocessors will operate at voltages as low as 1 volt and will have a current demand of up to 80 amps. This will significantly increase resistive losses and inductive effects in wires and conductors connecting the power supply to the microprocessor. As a result of the resistive losses and the inductance of such power coupling wires or conductors, a power supply with a wire harness is not able to deliver an accurately regulated low voltage to components on the motherboard drawing large transient currents.

In addition to having high resistive losses and inductive effects, wire harnesses are difficult to use. Furthermore, the connectors between the wire harnesses and the components often pose reliability concerns.

The above disadvantages of using wire harnesses are well known in the art and have resulted in the use of distributed power systems in some applications. In a distributed power system, a simple AC to DC power supply produces a single voltage output which is distributed around the system. Typically, the power supply produces a bus voltage of 48 volts. This voltage is preferred because it is low enough to ensure compliance with international safety standards, yet high enough to reduce distribution losses which are proportional to the square of the current. However, other bus voltages, such as 24 or 12 volts, are also possible. The distributed power system also includes one or more high density DC to DC converters (i.e., converters that have a high power output per cubic volume of space that they occupy). These high density DC to DC converters are powered by the bus voltage and are placed in close proximity to the high power demand components powered by the power source. The reduced distance between the high power demand components and the adjacent power converter significantly reduces the resistive losses and the inductive effects in the wires and conductors coupling the power converter to the component.

However, fully distributed power systems are not yet cost effective in high volume, low cost systems, such as personal computer systems. Nonetheless, some components in personal computers require a very fast response from the AC-DC or DC-DC converter to which they are coupled. For example, many high performance processor chips used in personal computers require a fast transient current response from a DC to DC converter providing a tightly regulated programmable output from 1.8 to 3.6 volts to the processor chip. The need for precise voltage regulation by such chips requires use of what is known in the art as a voltage regulator module (VRM). A VRM can be either a complete plug-in DC to DC converter or a circuit implemented on the motherboard. The addition of a VRM to a power system increases the cost of the power system by approximately 50%. Additionally, VRMs occupy valuable motherboard area. This is particularly significant when the "wasted" area under the power converter or VRM is, for example, a portion of a 12–14 layer high density high cost motherboard.

Therefore, it is desirable to tightly regulate the voltage applied to one or more IC chips mounted on a PCB. It is also desirable to reduce resistive losses and inductive effects in delivering power to components on a printed circuit board. It is also desirable to efficiently utilize the surface area of a printed circuit board.

SUMMARY OF THE INVENTION

Broadly stated, the present invention encompasses a connector which minimizes resistive losses, conduction losses of high frequency components of transient currents, and inductive effects. In one embodiment, the present invention encompasses a male connector for mating with a corresponding female connector coupled to a power supply to transmit power from the power supply to a printed circuit (PC) board having a high current demand integrated circuit (IC) chip disposed thereon, wherein the male connector comprises: a body portion; an insulating layer disposed above said body portion, said insulating layer having a first side and a second side; a first electrically conductive plate having a top portion and a bottom portion, said top portion of said first electrically conductive plate disposed on said first side of said insulating layer and said bottom portion of said first electrically conductive plate extending substantially through the entire length of said body portion; first means for electrically coupling said first electrically conductive plate to the PC board, wherein said first means is coupled to the bottom of said bottom portion of said first electrically conductive plate; a second electrically conductive plate substantially parallel to said first electrically conductive plate, said second electrically conductive plate having a top portion and a bottom portion, said top portion of said second electrically conductive plate disposed on said second side of said insulating layer and said bottom portion of said second electrically conducting plate extending substantially through the entire length of said body portion; and second means for electrically coupling said second electrically conductive plate to the PC board, wherein said second means is coupled to the bottom of the bottom portion of said second electrically conductive plate.

The present invention also encompasses a mounting structure, comprising the male connector of the present invention, for coupling power from a power supply to a predetermined area on a motherboard adjacent to an integrated circuit chip or chips. The mounting structure of the present invention comprises: a frame; a plurality of legs attached to the frame for supporting said frame on the motherboard, the ends of said legs opposite said frame being attached to the motherboard; means for releasably fastening said power supply to said frame such that the power supply is positioned a predefined distance above the upper surface of the motherboard; and a male connector for mating with a corresponding female connector coupled to the power supply for connecting the power output by the power supply to the motherboard at an area on the motherboard adjacent one or more high power demand IC chips, said male connector comprising: a body portion; an insulating layer disposed above said body portion, said insulating layer having a first side and a second side; a first electrically conductive plate having a top portion and a bottom portion, said top portion of said first electrically conductive plate disposed on said first side of said insulating layer and said bottom portion of said first electrically conductive plate extending substantially through the entire length of said body portion; first means for electrically coupling said first electrically conductive plate to the PC board, wherein said first means is coupled to the bottom of said bottom portion of said first electrically conductive plate; a second electrically conductive plate substantially parallel to said first electrically conductive plate, said second electrically conductive plate having a top portion and a bottom portion, said top portion of said second electrically conductive plate disposed on said second side of said insulating layer and said bottom portion of said second electrically conducting plate extending substantially through the entire length of said body portion; and second means for electrically coupling said second electrically conductive plate to the PC board, wherein said second means is coupled to the bottom of the bottom portion of said second electrically conductive plate; wherein the IC chip is powered by the power output by said power supply via said connector such that resistive losses and self-inductive effects in delivering power from said power supply to the IC chip are minimized.

In another embodiment of the present invention, the male connector is not a part of the mounting structure. Instead, the connector is placed adjacent to the mounting frame.

In another embodiment, the present invention also encompasses a power supply system for mounting on a motherboard on which at least one high current demand integrated circuit (IC) chip is mounted, said power supply system for coupling power to a predetermined area on the motherboard adjacent to the IC chip, said power supply system comprising: a power supply; and a mounting structure upon which said power supply is releasably fastened by placing one end of said power supply on said mounting structure and rotating said power supply about an axis of rotation at said one end such that said power supply is lowered onto said mounting structure and releasably locked thereto, said mounting structure comprising: a frame; a plurality of legs attached to said frame for supporting said frame on the motherboard such that said power supply, when releasably locked to said mounting structure, is positioned a predefined distance above the upper surface of the motherboard, the ends of said legs opposite said frame being attached to the motherboard; and a connector for interconnecting said power supply and the motherboard, said connector comprising a male connector portion and a female connector portion, said male and female connector portions having a longitudinal plane of contact that is substantially perpendicular to said axis of rotation, said male connector portion comprising: a male body portion; an insulating layer disposed above said male body portion, said insulating layer having a first side and a second side; a first electrically conductive plate having a top portion and a bottom portion, said top portion of said first electrically conductive plate disposed on said first side of said insulating layer and said bottom portion of said first electrically conductive plate extending substantially through the entire length of said male body portion; first means for electrically coupling said first electrically conductive plate to the PC board, wherein said first means is coupled to the bottom of said bottom portion of said first electrically conductive plate; a second electrically conductive plate substantially parallel to said first electrically conductive plate, said second electrically conductive plate having a top portion and a bottom portion, said top portion of said second electrically conductive plate disposed on said second side of said insulating layer and said bottom portion of said second electrically conducting plate extending substantially through the entire length of said male body portion; and second means for electrically coupling said second electrically conductive plate to the PC board, wherein said second means is coupled to the bottom of the bottom portion of said second electrically conductive plate; and said female connector portion comprising: a female body portion having a slot formed therein, said slot sized to enable said first and second conducting plates and said insulating layer to be releasably contained in said slot when said male and female connector portions are joined together; a first conductor mounted in said slot so as to mate with said first electrically conductive plate when said male and female connector portions are joined together for electrically coupling said first electrically conductive plate to said power supply; and a second conductor mounted on said slot so as to mate with said second electrically conductive plate when said male and female connector portions are joined together for electrically coupling said second electrically conductive plate to said power supply; wherein the IC chip is powered by the power output by said power supply via said connector such that resistive losses and self-inductance effects in delivering power from said power supply to the IC chip are minimized.

It is therefore, an object of the present invention to provide a connector that reduces resistive losses, conduction losses of high frequency components of transient currents and inductive effects.

It is an object of the present invention to provide a mounting structure for a power supply which enables the reduction of resistive losses and inductive effects in the delivering of power from the power supply to high power demand components, such as a microprocessor IC chip or chips on a motherboard of an electronic system such as a personal computer.

It is also an object of the present invention to tightly regulate the voltage applied to the high power demand components.

These and other objects of the present invention will become apparent to those skilled in the art from the following detailed description of the invention, the accompanying drawings, and the appended claims.

BRIEF DESCRIPTION OF THE DRAWINGS

FIG. 1 is a front perspective view of a power supply placed on a first embodiment of the mounting structure of the present invention.

FIG. 2 is a rear perspective partially exploded, partially cut away view of the mounting structure shown in FIG. 1.

FIGS. 3–6 are partially cut away side views showing the power supply being installed on said first embodiment of the mounting structure of the present invention.

FIG. 7 is a cross sectional view of the power supply mounted on the mounting structure taken along line 7'—7' of FIG. 6.

FIG. 8 is an exploded view of a power supply installed on a second embodiment of the mounting structure of the present invention.

FIG. 9 is a schematic diagram of one embodiment of the coupling of power between the power supply and the motherboard.

FIG. 10 is a schematic diagram of another embodiment of the coupling of power between the power supply and the motherboard.

FIG. 11 is a front perspective view of the first embodiment of the mounting structure of the present invention incorporating a first embodiment of a heatsink.

FIG. 12 is a front perspective view of the first embodiment of the mounting structure of the present invention incorporating a second embodiment of a heatsink.

FIG. 13 is an exploded view of the heatsink in FIG. 12 utilizing heat pipes to transfer heat to a second heatsink.

FIG. 14 is a front partially exploded perspective view of the mounting structure and heatsink combination shown in FIG. 12 incorporating cooling liquid pipes.

FIG. 15 is a front perspective view of an embodiment of the present invention incorporating extended bus bars.

FIG. 16 is a front perspective view of an embodiment of the present invention wherein the power supply is permanently attached to the mounting structure.

FIG. 24 is a schematic top view of the connector and the mounting frame of the present invention.

DETAILED DESCRIPTION OF THE INVENTION

Figure 17:
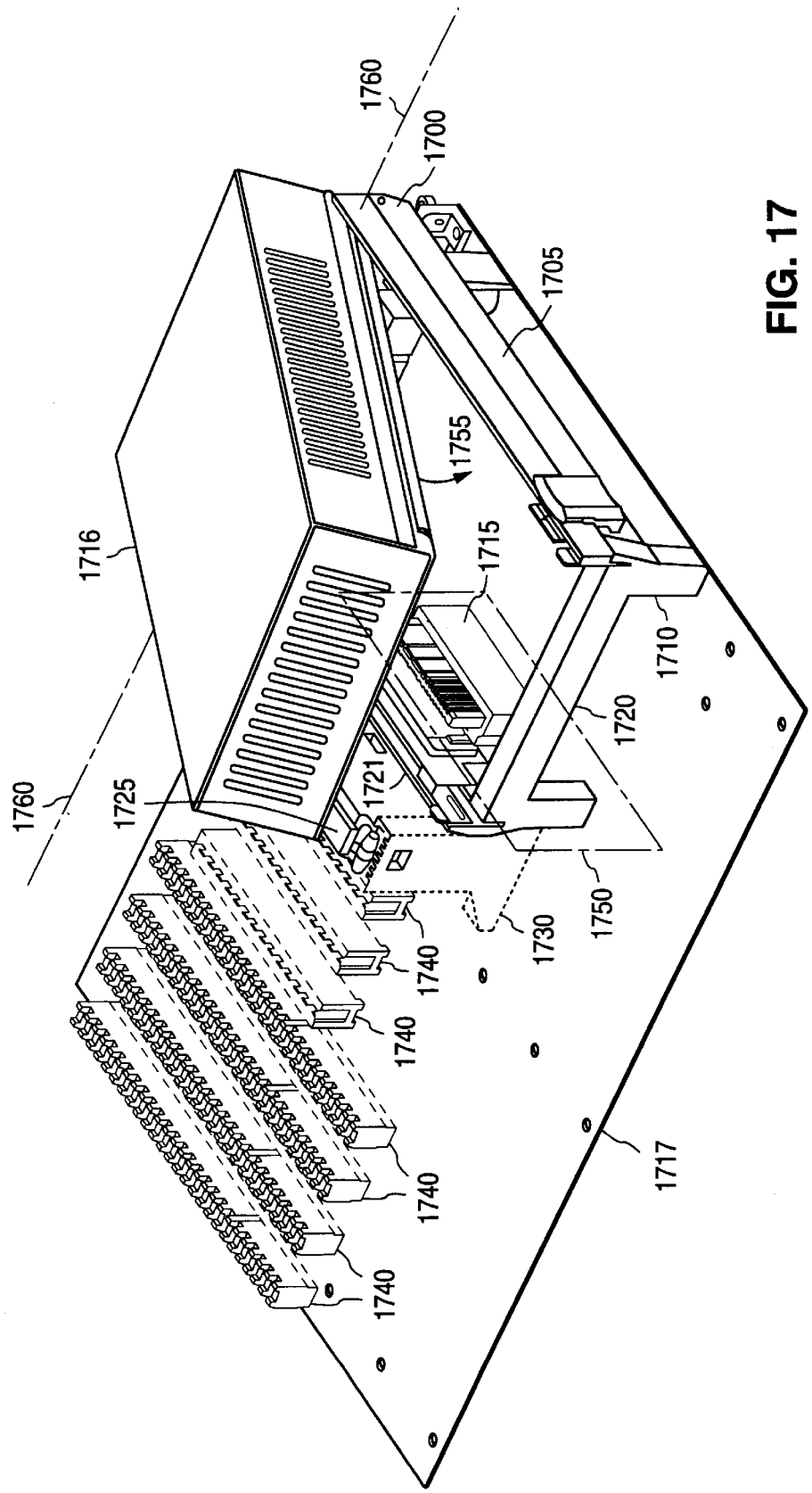
FIG. 17 is a front perspective view of another embodiment of the present invention wherein the power supply is electrically coupled to the motherboard via a male connector of the present invention disposed on the side of the mounting frame.

FIG. 1 shows a front perspective view of a power supply installed on a first embodiment of a mounting structure of the present invention. As shown in FIG. 1, a mounting structure 105 according to the present invention comprises four legs 110, a frame 115 coupled to the legs 110 and power buses 120 extending from frame 115 to a printed circuit motherboard 125. In a preferred embodiment, each of legs 110 has a longitudinal axis that is substantially perpendicular to the upper surface of motherboard 125. In a preferred embodiment of the present invention, power buses 120 are also substantially perpendicular to the upper surface of motherboard 125 and are inserted into couplers 130 in motherboard 125 and soldered to couplers 130. It is to be noted that some of the power buses 120 may be used to send control signals from the motherboard to the power supply. In another embodiment, the power buses can be directly soldered into the motherboard, in which case there would be no need for couplers 130. A power supply 140 is shown installed on mounting structure 105. Power supply 140 may be an AC to DC converter or a DC to DC converter. Power supply 140 receives input power from a source coupled to power supply 140 via socket 142, which for an AC input is preferably an IEC 320 socket with a separate standard AC cable, and outputs power to electrical components, such as IC chip 136, mounted on motherboard 125. Power supply 140 also outputs power via a coupling cable 141, which is preferably a group of output cables for coupling power to various peripherals (not shown). These electrical components may include one or more microprocessors or other electronic circuit components coupled to the motherboard. In one embodiment of the present invention, one or more IC chips, such as IC chip 136, may be disposed on the motherboard under the power supply 140 in an area adjacent to power buses 120 and couplers 130. IC chip 136 may be a microprocessor such as an Intel Pentium Pro or any other high power demand microprocessor. Power buses 120 conduct power from power supply 140 to IC chip 136 on motherboard 125. Power buses 120 may also provide mechanical support for mounting structure 105. It is to be noted that IC chip 136 is placed adjacent power buses 120 and couplers 130 so as to minimize the length of the power conductors and the adjacent power buses 120 between power supply 140 and IC chip 136. Reducing the length of these power lines reduces the resistive losses and the inductive effects in the power lines and, therefore, improves the voltage regulation and the efficiency with which power is delivered to the IC chip or chips on the motherboard. Delivering power to IC chip 136 efficiently and within a narrow voltage band specification under all chip operating conditions is particularly important when the IC chip has a rapidly changing high power demand, i.e., it draws a significant amount of current at a low voltage and/or the amount of current it draws varies rapidly within a very short period of time.

In addition to reducing resistive losses and inductive effects, the mounting structure 105 of the present invention allows more efficient use of the surface area of the motherboard 125 because it permits placement of high power demand components, such as IC chip 136, in an area of the motherboard either beneath or adjacent to power supply 140. The efficient use of the surface area of the motherboard to carry high cost, high density semiconductor ICs is particularly significant when, as in a preferred embodiment of the present invention, motherboard 125 is a multilayer high density motherboard. It is to be noted that motherboard 125 need not be a multilayer high density motherboard and may be any type of printed circuit board. Similarly, it is to be noted that the high power demand components are not restricted to being ICs and may be any other type of high power demand component.

Although, in a preferred embodiment, one or more IC chips are positioned under the power supply 140, placing an IC chip under the power supply is not necessary for deriving the benefits of reduced resistive losses and inductive effects (and the consequent tightly regulated voltage application to the IC chip(s)) provided by the mounting structure of the present invention. The important factor for deriving the benefits of reduced resistive losses and inductive effects is the proximity between the IC chip and the area where the power buses 120 are electrically connected to the motherboard. Thus, for example, placing an IC chip on or near an area adjacent to power buses 120 and couplers 130, such as the area outlined by dashed rectangle 135, which is not under power supply 140, will still provide the benefits of lower resistive losses and inductive effects provided by the mounting structure of the present invention. As shown in FIG. 17 and described below, the IC chip may also be placed on the side of the mounting structure.

Additionally, while legs 110 are for supporting the mounting structure on the motherboard, they may also serve other purposes. For example, the front legs 110, i.e., the legs closer to power buses 120, may comprise conductors that are used to deliver power from the power supply to the motherboard and the electronic components disposed thereon. Thus, in one embodiment of the present invention, the front legs 110 may comprise power buses 120, so as to electrically couple the power supply to the motherboard and the electronic components disposed thereon. In a preferred embodiment of the present invention wherein such conductive legs 110 are used, they would preferably be encased in an insulating material.

FIG. 2 shows a rear perspective view of the mounting structure 105 shown in FIG. 1 with the power supply 140 removed. FIG. 2 also shows IC chip 136 disposed on the motherboard adjacent power buses 120 and couplers 130. Mounting structure 105 comprises a frame 115 and a plurality of legs 110 attached to frame 105 for supporting frame 115 on motherboard 125. As shown in FIG. 2, the ends of legs 110 opposite frame 105 are attached to motherboard 125. Mounting structure 105 further comprises means for releasably fastening a power supply to frame 115 such that the power supply is positioned a predefined distance above the upper surface of the motherboard. Frame 115 of mounting structure 105 includes horizontal segment 200, whose longitudinal axis is parallel to the upper surface of motherboard 125. Horizontal segment 200 includes a plurality of sockets 205 which are disposed on its upper surface. Power pins from the power supply are inserted into sockets 205 when the power supply is mounted on the mounting structure 105 to allow power from the power supply to be coupled to the motherboard via power buses 120. The fastener means includes a pair of pivoting hooks 215 located near the rear end of frame 115. Fastener means also preferably includes a pair of spring loaded locking mechanisms 220 near the front end of frame 115. Each spring loaded locking mechanism 220 comprises a sliding hook 221, a spring compression tab 222, a spring 223 and a release tab 224 for unlocking spring loaded locking mechanism 220.

FIGS. 3–6 are partially cut away side views which together illustrate installation of a power supply on mounting structure 105 according to the present invention. In FIG. 3–6, the encircled numbers 1–5 indicate sequential steps in the installation of power supply 140 on the mounting structure 105. In step one, shown in FIG. 3, power supply 140 is pushed back in the direction shown by the arrow 351 as pivoting hooks 215 are inserted into corresponding apertures at the back end of power supply 140. As pivoting hooks 215 are inserted into corresponding apertures in power supply 140, overextending portions 315 of hooks 215 slide over plate 340. Once pivoting hooks 215 are sufficiently inserted into the corresponding apertures and overextending portions 315 sufficiently cover plate 340, power supply 140 is preferably pivoted upward in the direction shown by arrow 352. As shown in FIG. 4, as pivoting hooks 215 are further inserted into said corresponding apertures, pivoting hooks 215 are further pivoted upward and overextending portions 315 further cover plate 340. Then power supply 140 is pivoted downward in the direction shown by arrow 453. Subsequently, as shown in FIG. 5, the front portion of power supply 140 is lowered onto sliding hook 221 of the locking mechanism 220. As shown in FIG. 5, plate 340 rests on hook 221. The weight of the power supply 140 and any additional downward force applied thereto causes sliding hook 221 to be pushed back in the direction of arrow 554 by plate 340. As sliding hook 221 is moved in the direction of arrow 554, power supply 140 is lowered further downward until the lower surface of power supply 140 is in full contact with the horizontal surface 211 (shown in FIG. 2) of the frame member 210. As power supply 140 is fully lowered, as shown in FIG. 6, spring 223 causes the sliding hook 221 to slide back in the direction opposite to that shown by arrow 454. On each side of power supply 140, the overextending portions 315 and 321 of hooks 215 and 221, respectively, rest on the back and front ends, respectively, of plate 340 in power supply 140. This locks power supply 140 onto the frame 115 and consequently mounting structure 105. In a preferred embodiment of the present invention, a pair of rails positioned along the sides of an extruded power supply casing are used instead of plate 340 to achieve the above locking effect.

Spring loaded locking mechanism 220 thus secures power supply 140 to frame 115 and mounting structure 105 and ensures sufficient pressure for electrical contact between power pins coupled to power supply 140 and sockets 205 on horizontal segment 200. To remove power supply 140, release tabs 224 are moved towards the front end 650 of mounting structure 105, which causes overextending portion 621 to be moved away from plate 340, thus releasing the front end of power supply 140 and enabling its removal from mounting structure 105 in a manner that is the reverse of what is shown in FIGS. 3–6.

Mounting structure 105 allows easy installation and removal of a power supply. Additionally, mounting structure 105 is not specific to any particular power supply. Therefore, mounting structure 105 may be used with any power supply having a frame adapted to snap onto mounting structure 105. This allows mounting structure 105 to be used with a variety of power supplies. It further facilitates the installation of a power supply upgrade or replacement. This is useful since a new, more high powered microprocessor IC chip may be installed on the motherboard, and may have different power requirements than the IC chip being replaced. In other words, since the replacement of the power supply is facilitated, the replacement of an IC chip with a new IC chip of higher power, or other different power needs, is easily accommodated.

FIG. 7 shows a cross sectional view of power supply 140 mounted on mounting structure 105 along line 7'—7' in FIG. 6. As shown in FIG. 7, overextending portions 315 of hooks 215 help secure plate 340 to frame 115.

FIG. 8 shows an exploded perspective view of a second embodiment of a mounting structure of the present invention. As shown in FIG. 8, mounting structure 805 is fastened to motherboard 825 by screws 820. Power supply 840 is affixed to mounting structure 805 by clips 818. Mounting structure 805 includes a plurality of legs 810 for supporting the mounting structure 805. A pair of frame members 815 are coupled to the legs 810. Frame members 815 each have a longitudinal axis that is parallel to the upper surface of motherboard 825. Furthermore, to increase rigidity, mounting structure 805 may include a support bar 816 connected between legs 810 at the front end of mounting structure 805, as shown. The lower surface of support bar 816 is preferably in direct contact with the upper surface of motherboard 825 while its upper surface has a plurality of sockets 817 disposed thereon. A plurality of power buses 845 are disposed on the bottom of power supply 840 and are inserted into sockets 817 so as to electrically couple power supply 840 to motherboard 825 and electrical components disposed thereon. It is to be noted that, whereas in mounting structure 105, the power buses are part of the mounting structure, mounting structure 805 does not include power buses. Frame members 815 each include two clips 818 disposed thereon. A ridge 819 in each clip 818 is inserted into a groove 842 on the side of power supply 840 so as to releasably fasten power supply 840 to mounting structure 805. As also shown in FIG. 7, a heatsink 830 is disposed above an IC chip (not shown) coupled to the motherboard. Heatsink 830 dissipates heat generated by the IC chip. It may also help dissipate heat generated by power supply 840. The IC chip disposed below heatsink 830 is powered by power supply 840 via power buses 845. The IC chip is disposed adjacent the power buses. More specifically, the area on the motherboard where the power buses 845 or sockets 817 are electrically coupled to the motherboard is as close to the IC chip as possible such that resistive losses and inductive effects in delivering power to the IC chip are minimized.

FIG. 9 shows a schematic diagram of one embodiment of the coupling between a power supply and a motherboard. As shown in FIG. 9, power supply 940 is disposed above mounting structure 905, which is in turn disposed on motherboard 925. Mounting structure 905 comprises legs 910 and support bar 916 coupled to legs 910. Power buses 920 coupled to the bottom of power supply 940 are inserted into corresponding sockets on support bar 916. Power from the power supply 940 is coupled to motherboard 925 via power buses 920 and conductors (not shown) in support bar 916.

Also shown in FIG. 9 are connectors 960 and 961 coupled to support bar 916 and power supply 940, respectively. It is to be noted that, in a preferred embodiment of the present invention, only one of connectors 960 and 961 is coupled to mounting structure 905. It is also to be noted that both connectors 960 and 961 are shown in FIG. 9 to demonstrate the alternative sites for coupling connectors and that in some embodiments, as shown in FIG. 9, it is possible to have both connectors coupled to mounting structure 905. In a preferred embodiment, connectors 960 and 961 are conventional female sockets. Connector 960 is electrical coupled to the power supply 940 via power buses 920 and conductors (not shown) in support bar 916 while connector 961 is directly electrically coupled to power supply 940. It is to be noted that connectors 960 and 961 need not be female sockets but may be any type of connector. Connectors 960 and 961 enables power to be coupled to one or more peripheral devices, such as peripheral devices 1 and 2, from power supply 940.

FIG. 10, shows a schematic diagram of another embodiment of the coupling between power supply 1040 and motherboard 1025. In the embodiment shown in FIG. 10, there is no support bar 1016. Instead, power buses 1020 are coupled to motherboard 1025 by couplers 1030 on motherboard 1025. As in FIG. 9, a connector 1061 enables power supply 1040 to provide power to one or more peripheral devices (not shown) in addition to providing power to motherboard 1025.

FIG. 11 is a front perspective view of the mounting structure shown in FIG. 1 incorporating an integral heatsink. As shown in FIG. 11, mounting structure 105 includes a heatsink 1100. Vanes 1105 are shown by dashed lines to emphasize that they are behind horizontal segment 200 in the view shown in FIG. 11. Also shown in FIG. 11 are sockets 205. Unlike in FIG. 2, not all the sockets on horizontal segments 200 are shown so as not to unduly obscure the view of vanes 1105 in the mounting structure of FIG. 11. Heatsink 1100 is integral with mounting structure 105 and includes vanes 1105 to increase heat dissipation from heatsink 1100. It is to be noted that heatsink 1100 need not be integral with mounting structure 105, but may in some embodiments be coupled to mounting structure 105. Heat sink 1100 dissipates heat generated by the power supply disposed above heatsink 1100. In a preferred embodiment, heatsink 1100 is made of aluminum. It is to be noted that heatsink 1100 may be made of any other material suitable for heat dissipation.

FIG. 12 is a front perspective view of the mounting structure shown in FIG. 1 incorporating a second heatsink. Heatsink 1200 is integral with mounting structure 105. In another embodiment of the present invention, heatsink 1200 may be snapped onto mounting structure 105 in a conventional manner rather than being integral therewith.

FIG. 13 shows an exploded view of heatsink 1200 shown in FIG. 12 attached to a second heatsink. As shown in FIG. 13, heatsink 1200 includes a plurality of heat pipes 1305 coupled to a heat plate 1310. Additionally heat pipes 1305 are coupled to a second heatsink 1315. Heatsink 1315 is coupled to the back of the PC chassis (not shown). In a preferred embodiment, heat plate 1310 and heatsink 1315 are all made of aluminum, but may be made of any other material suitable for heat dissipation. Heat pipes 1305 may comprise Noren Mini Flats (available from Noren Products, Inc.) or equivalent heat transfer devices. Power supply 140 is shown in phantom.

FIG. 14 is a partially exploded view of the mounting structure and heatsink of the type shown in FIG. 12 further incorporating cooling liquid pipes 1400. Also shown in FIG. 14 are power supply 140 and motherboard 125. Cooling liquid is injected into cooling liquid pipes 1400 at entrance 1405. As the cooling liquid passes through cooling liquid pipes 1400, heat from heatsink 1200 is transferred to the cooling liquid. Thus, when the cooling liquid exits the cooling pipes 1400 at exit 1410, the temperature of the cooling liquid is higher than it was when the cooling liquid entered cooling pipes 1400. The cooling liquid, therefore, removes heat from heatsink 1200. In a preferred embodiment of the present invention, the cooling liquid is water. It is to be noted that other cooling liquids may be used to remove heat from heatsink 1200.

In one embodiment of the present invention, the power supply can incorporate a fan which cools components mounted on the motherboard and under the mounting structure.

FIG. 15 shows power supply 140 mounted on mounting structure 105. Also shown in FIG. 15 are bus bars 1500 which deliver power to devices located on motherboard 125. Vertical portions 1505 of bus bars 1500 extend downward along legs 110 of mounting structure 105 and couple power from power supply 140 to the horizontal portions 1510 of bus bars 1500. Horizontal portions 1510 are supported on motherboard 125 by stands 1515. In a preferred embodiment of the present invention, horizontal portions 1510 run above motherboard 1525 such that there is sufficient clearance between horizontal portions 1510 and motherboard 1525 to allow electronic devices to be located on the surface of motherboard 1525 in areas underneath horizontal portions 1510. Also shown in FIG. 15 are power tabs 1520 for delivering power from the bus bars 1500 to a device to be powered by bus bars 1500. Stands 1515 are conductive and allow power to be delivered from bus bars 1500 to motherboard 125 with negligible resistive losses.

FIG. 16 shows a front perspective view of an embodiment of the present invention wherein mounting structure 105 is integral with or otherwise permanently affixed to power supply 140. As mounting structure 105 is integral with power supply 140, it does not comprise release tabs 224 (shown in FIG. 1 and referenced in FIG. 2) to unlock the power supply from the mounting frame. The elements of the integral mounting structure-power supply combination (power supply system) 1600 of FIG. 16 are referenced with the same numbers and serve the same purpose as their corresponding components in FIG. 1. As those components have been described in relation to FIG. 1, they will not be further described herein.

FIG. 17 is a front perspective view of another embodiment of the present invention wherein the power supply is electrically coupled to the motherboard via a connector of the present invention disposed on the side of the mounting structure. As shown in FIG. 17, mounting structure 1700 comprises mounting frame 1705, legs 1710, and male connector 1715. In the embodiment shown in FIG. 17, male connector 1715, in conjunction with the female connector, which is coupled to power supply 1716 and shown schematically in FIGS. 23–29, acts as a power bus for coupling the power supply 1716 to motherboard 1717.

As can be seen in FIG. 17, unlike the power buses in the other embodiments which were disposed adjacent and parallel to the front horizontal bar, such as horizontal bar 1720 in FIG. 17, of the mounting frame, connector 1715 is preferably disposed adjacent and parallel to a side bar 1721 of mounting frame 1705. This allows the longitudinal plane 1750, shown in phantom, of male connector 1715 to be perpendicular to the axis of rotation 1760, also shown in phantom, of power supply 1716. It is to be noted that longitudinal plane 1750 is also the longitudinal plane of the female connector. It is also to be noted that the male and female connectors contact along the surface of conduction plates of the male connector which are more clearly shown in FIG. 18 and are parallel to the longitudinal plane 1750, as explained in the description of FIG. 24.

Figure 23:
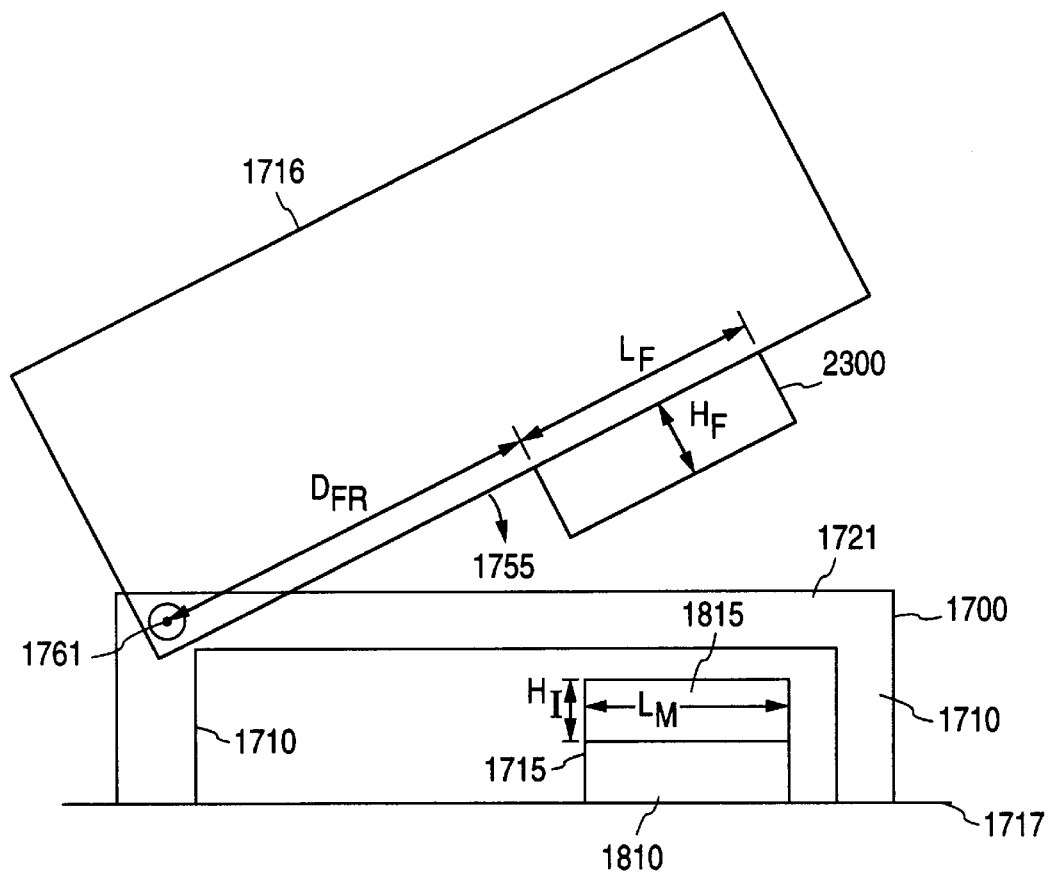
FIG. 23 is a side schematic view of the power supply mounted on mounting structure according to the present invention.

FIG. 23 shows a side schematic view of power supply 1716 mounted on mounting structure 1700. Power supply 1716 includes female connector 2300. As power supply 1716 is rotated downwards in the direction of arrow 1755, the axis of rotation of power supply 1716 is a line passing through point 1761 and perpendicular to the plane of the paper upon which FIG. 23 is shown. The longitudinal axis of male connector 1715 and female connector 2300 is parallel to the plane of the paper. Therefore, the axis of rotation of the power supply is perpendicular to the longitudinal plane of male connector 1715 and female connector 2300.

In a preferred embodiment of the present invention, the length, $L_F$, of female connector 2300 is greater than the length, $L_M$, of male connector 1715 so as to enable female connector 2300 to mate with male connector 1715 as female connector is rotated downward onto male connector 1715. The difference between $L_F$ and $L_M$ is a function of the distance, $D_F$, from point 1761 on the axis of rotation to female connector 2300, the length, $L_M$, and the height, $H_F$, of female connector 2300 and the height of the insulation layer, $H_I$. In another embodiment of the present invention, such as that shown in FIG. 29, where the female connector does not comprise end walls, $L_F$ need not be greater than $L_M$ since the ends of the female connector 2300 are open.

When the male and female connectors mate, they contact on the surface of the conduction plates. Thus, the longitudinal planes of contact between the male and female connectors are defined by the planes on the outer surface of the conduction plates and are parallel to longitudinal plane 1750. FIG. 24 is a schematic top view of the connector and the mounting frame of the present invention. Conductors 2400 of female connector 2300 contact the first conducting plates 1820, 1825, 1830 and 1835 and low current supply pins 1840 at a first contact plane. The first contact plane contains line 2405 and is perpendicular to the plane of the paper upon which FIG. 24 is shown. Similarly, conductors 2400 of female connector 2300 contact conducting plates 1845 and 1850 and low current return pins 1855 at a second contact plane. The second contact plane contains line 2410 and is perpendicular to the plane of the paper upon which FIG. 24 is shown. Similarly, longitudinal plane 1750, which is the longitudinal plane of male connector 1715 and female connector 2300, contains line 1751 and is perpendicular to the plane of the paper upon which FIG. 24 is shown. Therefore, the contact planes and the longitudinal plane are all perpendicular to the plane of the paper and are parallel to each other. Additionally, the contact planes and the longitudinal plane are perpendicular, rather than parallel, to the axis of rotation 1760 of the power supply. The fact that the contact planes comprising lines 2405 and 2410 are perpendicular to the axis of rotation 1760 reduces the possibility of misalignment between conductors 2400 of female connector 2300 and the conducting plates and control pins of male connector 1715.

Additionally, referring again to FIG. 17, the placement of connector 1715 along the side bar 1721 allows minimizing the distance between the area where the connector is connected to motherboard 1717, i.e., the area on motherboard 1717 under connector 1715, and IC chip 1725 which is placed on socket 1730. The minimization of the distance between the footprints of connector 1715 and IC chip 1725 reduces resistive losses and inductive effects in coupling the connector to the IC chip. In the embodiment shown in FIG. 17, conductors (not shown) within socket 1730 deliver power from buses on or in motherboard 1717 to IC chip 1725. In another embodiment, pins from the IC chip are directly connected to the buses in the motherboard. Also shown in FIG. 17 are standard sockets 1740 for coupling peripheral devices to motherboard 1717.

Figure 18:
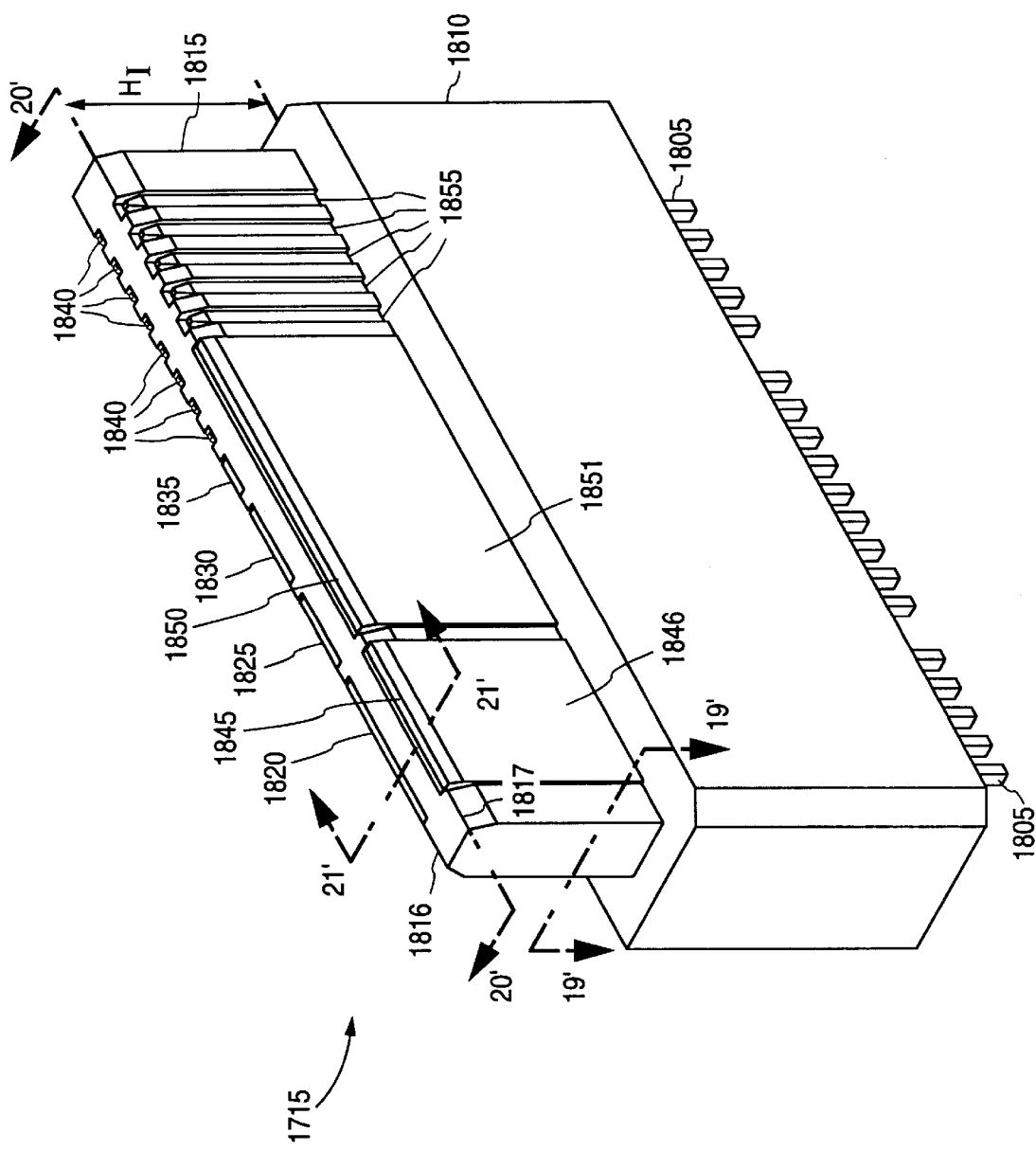
FIG. 18 is a perspective view of the male connector of the present invention shown in FIG. 17.

FIG. 18 is a perspective view of male connector 1715 in FIG. 17. As can be seen in FIG. 18, male connector 1715 comprises pins 1805, body portion 1810, insulation layer 1815, high current/low voltage supply plate 1820, medium current/medium voltage supply plates 1825, 1830 and 1835, low current supply pins 1840, high current/low voltage return plate 1845, medium current/medium voltage return plate 1850 and low current return pins 1855. Low current supply pins 1840 are control pins which transfer control signals between the power supply and the motherboard whereas low current return pins 1855 are control return pins that supply a ground reference signal. In a preferred embodiment of the present invention, plate 1820 supplies current at a voltage of 1.8 to 2.8 V whereas plates 1825 and 1830 supply current at voltages of 3.3 V and 5 V, respectively. Pins 1805 are for coupling male connector 1715 to the motherboard. Pins 1805 extend out from the bottom of body portion 1810 a predetermined amount so as to enable seating of pins 1805 in corresponding pinholes on the motherboard. In one embodiment of the present invention, male connector 1715 is coupled to the motherboard by soldering pins 1805 to the motherboard. In another embodiment, male connector 1715 may be coupled to the motherboard by simply inserting pins 1805 into corresponding spring loaded pinholes in the motherboard. In another embodiment, the pins coupled to a conducting plates, such as conducting plates 1845 and 1850 may be replaced by tongues protruding out of body portion 1810 a predetermined amount to enable seating the tongues into corresponding slots on the motherboard. FIG. 22 shows a cross sectional view of an embodiment of the male connector of the present invention wherein pins 1805 coupled to conduction plates 1845 and 1850 are replaced by tongues 1806 and 1807, respectively. Body portion 1810 is for supporting conductors (shown in FIGS. 20–22) inside the male connector 1715 whereas insulation layer 1815 supports the conductors disposed on the sides of insulation layer 1815, such as plates 1820, 1825, 1830, 1835, 1845, 1850 and pins 1840, 1855. As can be seen in FIG. 18, the power supply plates and their corresponding return plates are disposed on opposite sides of insulation layer 1815 and are parallel to each other. Thus, for example, high current/ low voltage supply plate 1820, which may be used to supply current to a high current demand IC chip such as a central processing unit (CPU), is disposed on a first side 1816 of insulation layer 1815 whereas high current/low voltage return plate 1845, which may be used as a CPU return plate, is disposed on a second side 1817 of insulation layer 1815. Additionally, plates 1820 and 1845 are parallel to each other. Similarly, plates 1825, 1830 and 1835 are disposed on first side 1816 of insulation layer 1815 whereas plate 1845 is disposed on second side 1817 of insulation layer 1815 and is parallel to plates 1825, 1830 and 1835. It is to be noted that the top portion of the conducting plates above are disposed on the sides of insulating layer 1815 whereas the bottom portion of the conducting plates are inside body portion 1810. Thus, for example, top portions 1846 and 1851 of plates 1845 and 1850, respectively, are disposed on the second side 1817 of insulating layer 1815. Finally pins 1840 and 1855, which are parallel to each other are disposed on the first side 1816 and second side 1817 of insulation layer 1815, respectively.

Figure 20:
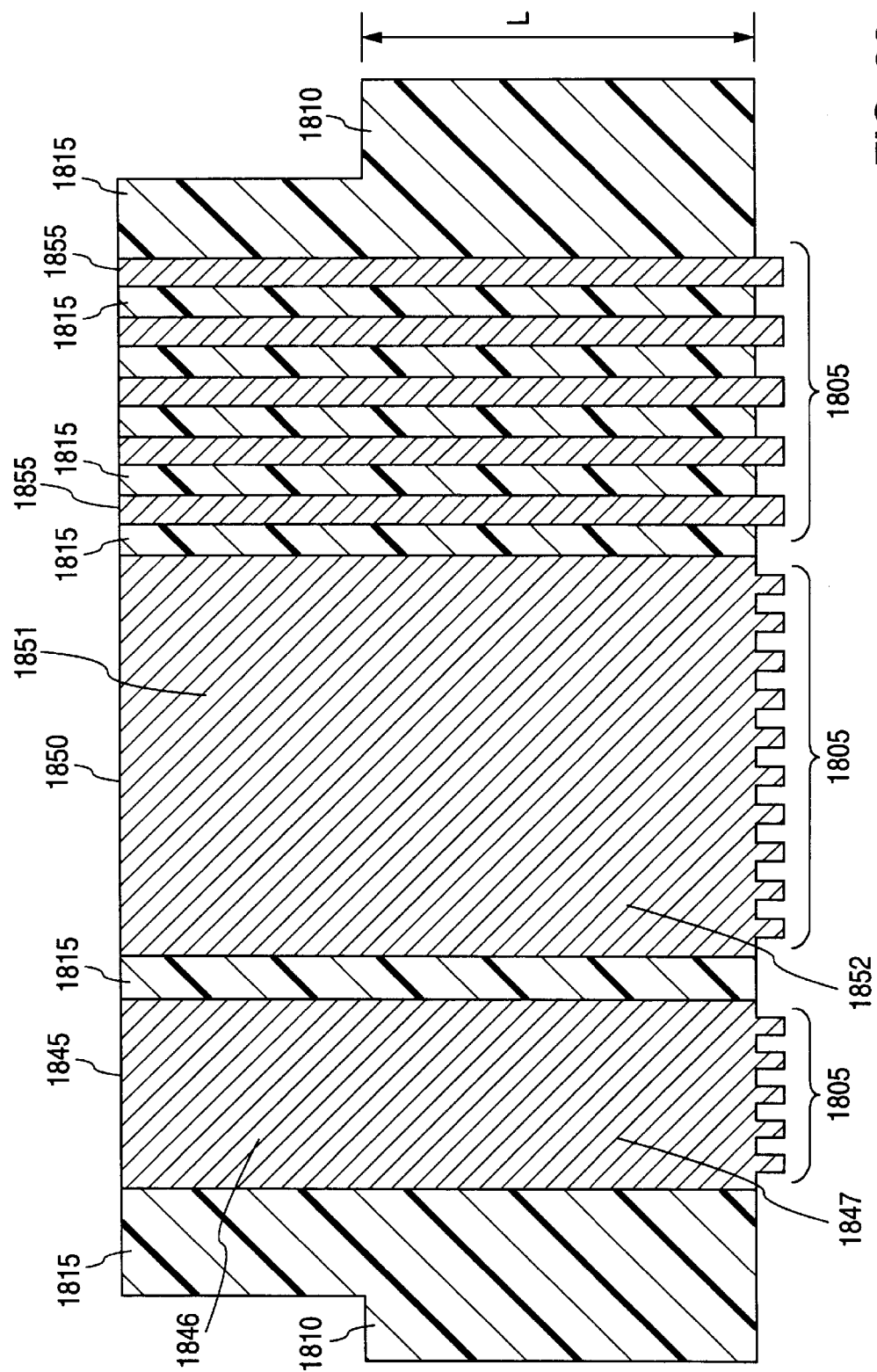
FIG. 20 is a cross sectional view of the male connector of the present invention taken along line 20'—20' in FIG. 18.
Figure 21:
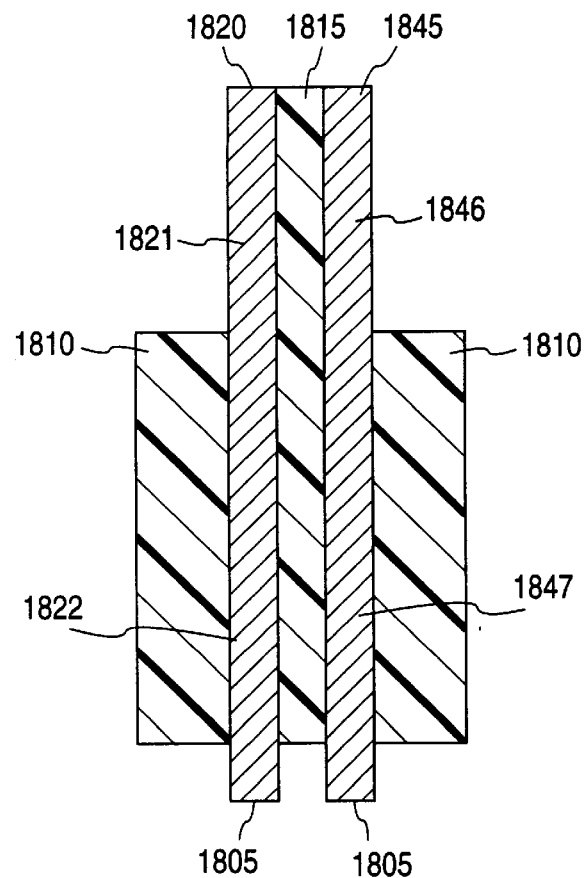
FIG. 21 is a cross sectional view of the male connector of the present invention taken along line 21'—21' in FIG. 18.
Figure 22:
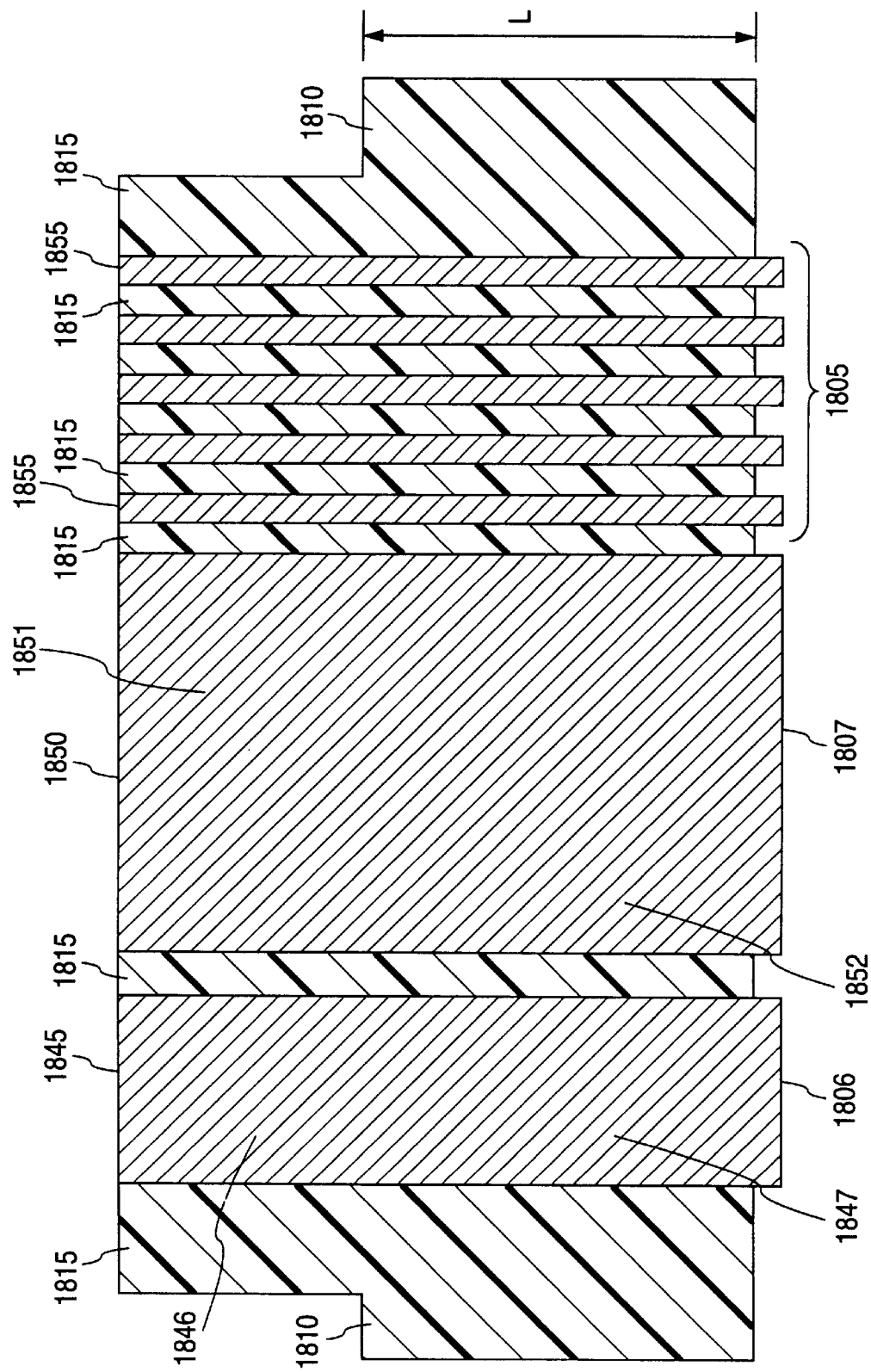
FIG. 22 is a cross sectional view, such as that shown in FIG. 21, of another embodiment of the male connector of the present invention.

FIG. 21 is a cross sectional view of male connector 1715 taken along line 21'—21' in FIG. 18. As shown in FIG. 21, bottom portions 1822 and 1847 of plates 1820 and 1845, respectively, extend through the entire length, L, of body portion 1810 whereas the top portions 1821 and 1846 of plates 1820 and 1845, respectively, are disposed on different sides of insulating layer 1815. Similarly, FIG. 20, which shows a cross sectional view of male connector 1715 taken along line 20'—20' of FIG. 18, shows the bottom portions 1847 and 1852 of plates 1845 and 1850, respectively, inside body portion 1810. FIG. 20 also shows that bottom portions 1847 and 1852 of plates 1845 and 1850, respectively, extend through the length, L, of body portion 1810. Similarly, FIG. 20 shows pins 1855, more specifically the bottom portion of pins 1855 extending through the length, L, of body portion 1810. Finally, as shown in FIG. 20, the bottom portion of control pins 1855 protrude outside body portion 1810. The portion of control pins 1855 outside body portion 1810 is represented by pins 1805. Similarly, additional pins 1805 are shown protruding outside body portion 1810 and coupled to the bottom of bottom portions 1847 and 1852 of plates 1845 and 1850, respectively.

As can been seen in FIG. 18, the power supply plates 1845 and 1850 have a large surface area. This large surface area is important to ensure low loss conduction of high frequency components of the transient currents which only flow on the surface of the conductor, a process commonly referred to as the skin effect. Therefore, the connector of the present invention has a lower conduction loss of high frequency current components as compared to conductors having a lower surface area, such as conventional power pins.

Figure 19:
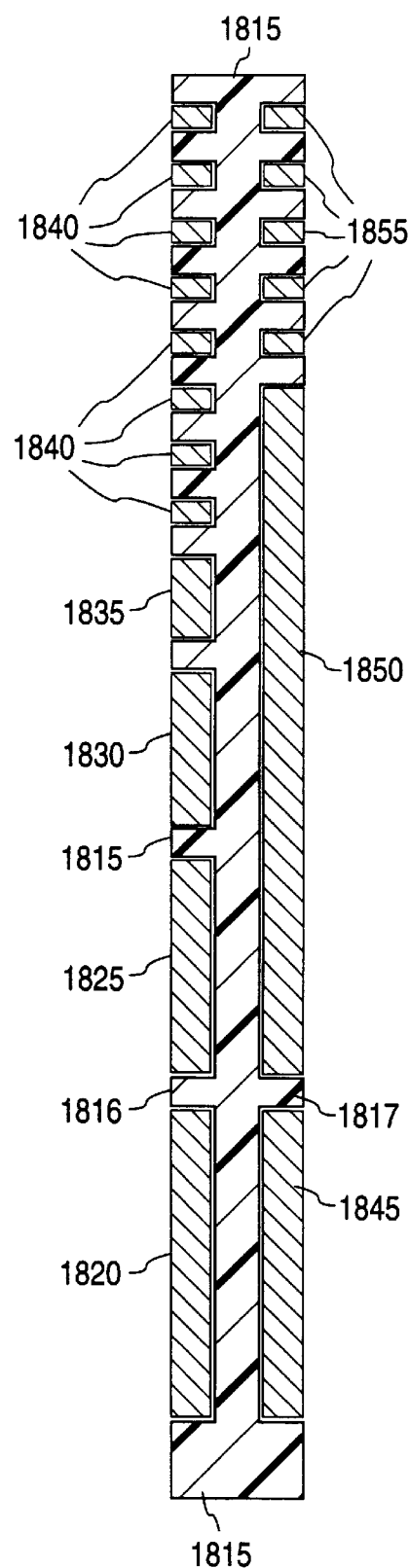
FIG. 19 is a cross sectional view of the male connector of the present invention taken along line 19'—19' in FIG. 18.

Similarly, as can been seen in FIG. 19, which is a cross sectional view of the connector taken along line 19'—19' in FIG. 18, the conduction plates in connector 1715 have a large cross sectional area. The large cross sectional area is important for the reduction of DC resistance in the conduction plates. Finally, the insulation layer, that separates the conductors disposed parallel to each other on its first and second sides, is relatively thin. This results in a very low characteristic inductance similar to a transmission line.

In a preferred embodiment, insulation layers 1815 is made of a molded plastic material and separates the conductors disposed thereon. Similarly, body portion 1810 is made of a molded plastic material so as to electrically isolate the conducting plates and pins disposed therein. Other insulating materials such as BAKELITE or a high temperature thermo setting polymer may also be used as an insulating material in body portion 1810 and insulating layer 1815. In a preferred embodiment of the present invention, the insulating material is chosen to have specific dielectric characteristics in order to control the impedance of the connector, which acts as a transmission line between the power supply and the motherboard. Similarly, in a preferred embodiment, the conductors disposed on and inside the insulating materials are tin plated copper. In another embodiment, gold plated conductors may be used instead of tin plated copper, again particulary in hostile environments, such as those having a high humidity, corrosiveness and temperature.

In another embodiment of the present invention, the width and separation of the conductors in the male connector of the present invention are adjusted to match the impedance of the connector (acting as a transmission line) to the source and/or the load to optimize the efficiency and transient response in delivering power to the load.

Figure 25:
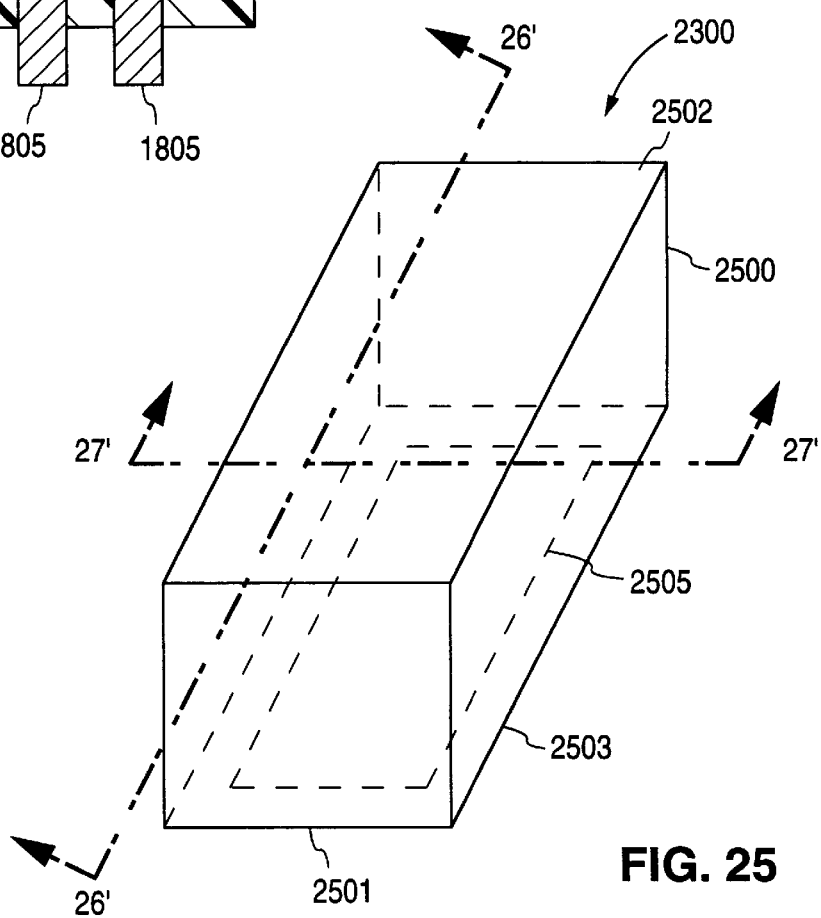
FIG. 25 is a schematic view of a female connector of the present invention.

FIG. 25 shows a schematic view of a female connector 2300 of the present invention. In a preferred embodiment of the present invention, the female connector is coupled to the bottom of the power supply frame. As shown in FIG. 25, female connector 2300 comprises a body 2500 having a slot 2510 formed therein, the opening of which is shown by rectangle 2505, which is shown in phantom.

Figure 26:
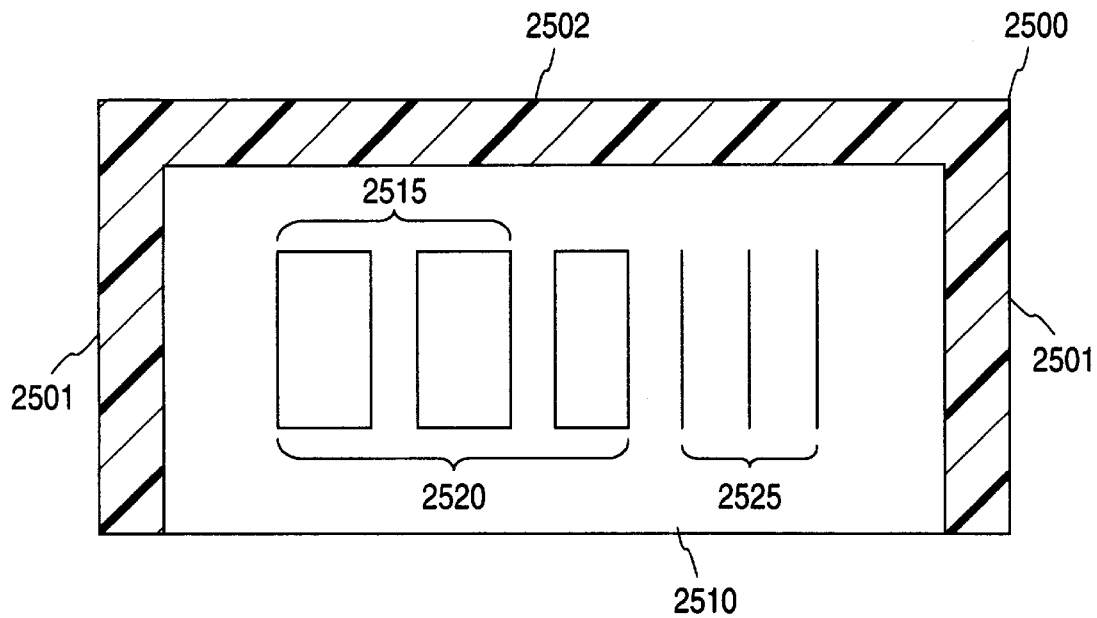
FIG. 26 is a schematic sectional view of female connector of the present invention taken along line 26'—26' in FIG. 25.

FIG. 26 shows a schematic sectional view of female connector 2300 taken along line 26'—26' in FIG. 25. As shown in FIG. 26, body 2500 comprises two end walls 2501 and top wall 2502, which collectively enclose slot 2510 from three sides. Also shown in FIG. 26 are schematic representations of conductors 2515, which include conducting plates 2520 and conducting wires 2525.

Figure 27:
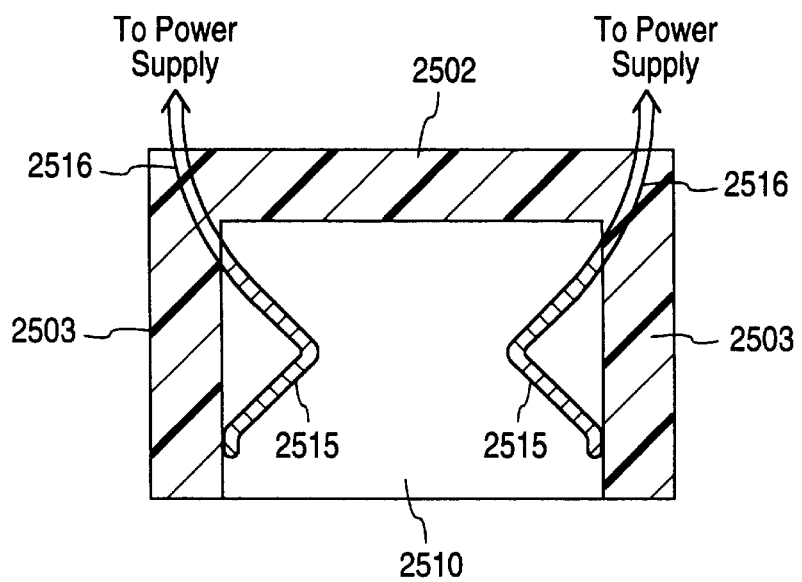
FIG. 27 is a cross sectional view of the female connector of the present invention taken along line 27'—27' in FIG. 25.
Figure 28:
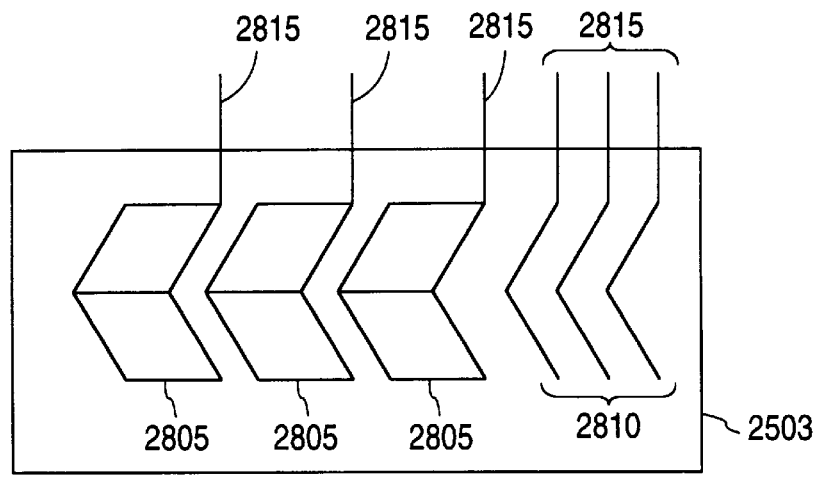
FIG. 28 is a schematic diagram of three spring loaded conducting plates and three spring loaded conducting wires disposed on a side wall of the female connector of the present invention.
Figure 29:
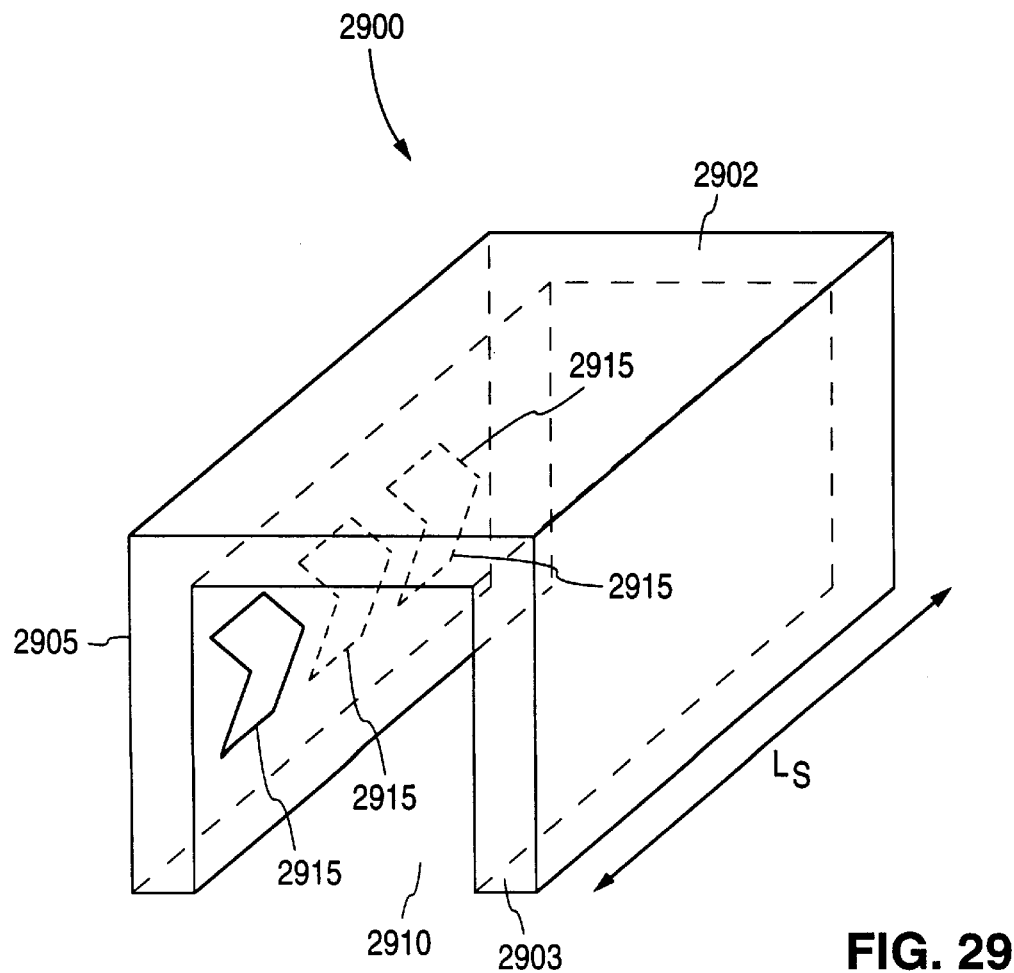
FIG. 29 is a schematic diagram of a second embodiment of the female connector of the present invention.

Similarly, FIG. 27 shows a cross sectional view of female connector 2300 taken along line 27'—27'. FIG. 27 shows side walls 2503 and top wall 2505. The two side walls 2503, the two end walls 2501 and top wall 2503 collectively enclose slot 2510 on five sides. Slot 2510 is sized to enable the top portion of plates and the insulating layer of the male connector to be releasably contained in slot 2510 when the male and female connectors are joined together. FIG. 27 also shows conductors 2515 disposed on side walls 2503 within slot 2510. Finally, FIG. 27 shows wires 2516 coupled to conductors 2515. Wires 2516 couple conductors 2515 to the power supply to which female connector 2300 is coupled. Conductors 2515 may be spring loaded conducting plates or spring loaded wires. Conductors 2515 are spring loaded so as to improve the contact between conductors 2515 and the corresponding conducting plates and pins of male connector 1715. In one embodiment, female connector 2300 of the present invention comprises a plurality of spring loaded conducting plates for contacting the conducting plates of male connector 1715, such that there is a one to one correspondence between the spring loaded conducting plates of female connector 2300 and conducting plates of male connector 1715. In another embodiment, a plurality of spring loaded conducting wires correspond to each of the conducting plates of male connector 1715. Similarly, female connector 2300 comprises spring loaded wires for connecting to the low current supply pins 1840 and the low current supply return pins 1855. FIG. 28 shows a schematic diagram of three spring loaded conducting plates 2805 and three spring loaded conducting wires disposed on a side wall 2503 of female connector 2300. The conductors 2805 and 2810, in FIG. 28 are coupled to the power supply by wires 2815 or some other suitable conductor.

In the embodiment shown in FIG. 25, body 2500 has end portions 2501 that enclose slot 2505 on two sides. In another embodiment of the female connector of the present invention, shown in FIG. 29, body 2905 of female connector 2900 does not comprise end walls. Instead, it comprises top wall 2902 and two side walls 2903. In female connector 2900, slot 2910 is not enclosed on five sides but only three. Therefore, unlike in the embodiment having end walls, the length, $L_S$, of slot 2505 need not be greater than the length of the male connector in order to allow mating between the male and female connectors.

Body 2500 of female connector 2300 is made of an insulating material, such as molded plastic, BAKELITE or a high temperature thermo setting polymer. In a preferred embodiment, the insulating layer is chosen to have specific dielectric characteristics in order to control the impedance of the connector. Conductors 2515 may be tin plated copper, a gold plated conductor, or some other suitable conductor.

Figure 30:
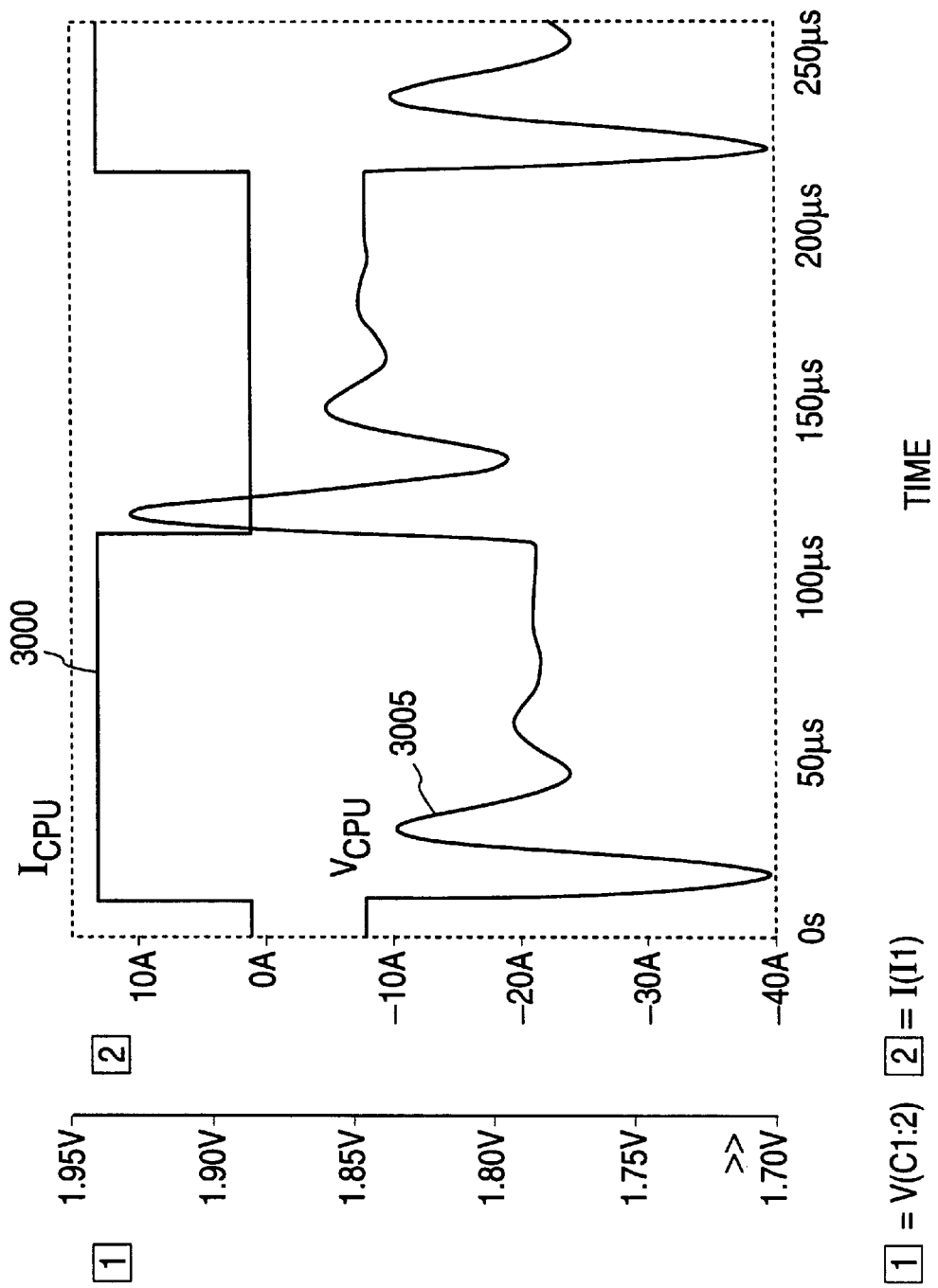
FIG. 30 is a graph of the current and voltage input into an IC chip versus time when using prior art power bars to couple power from the power supply to an IC chip.
Figure 31:
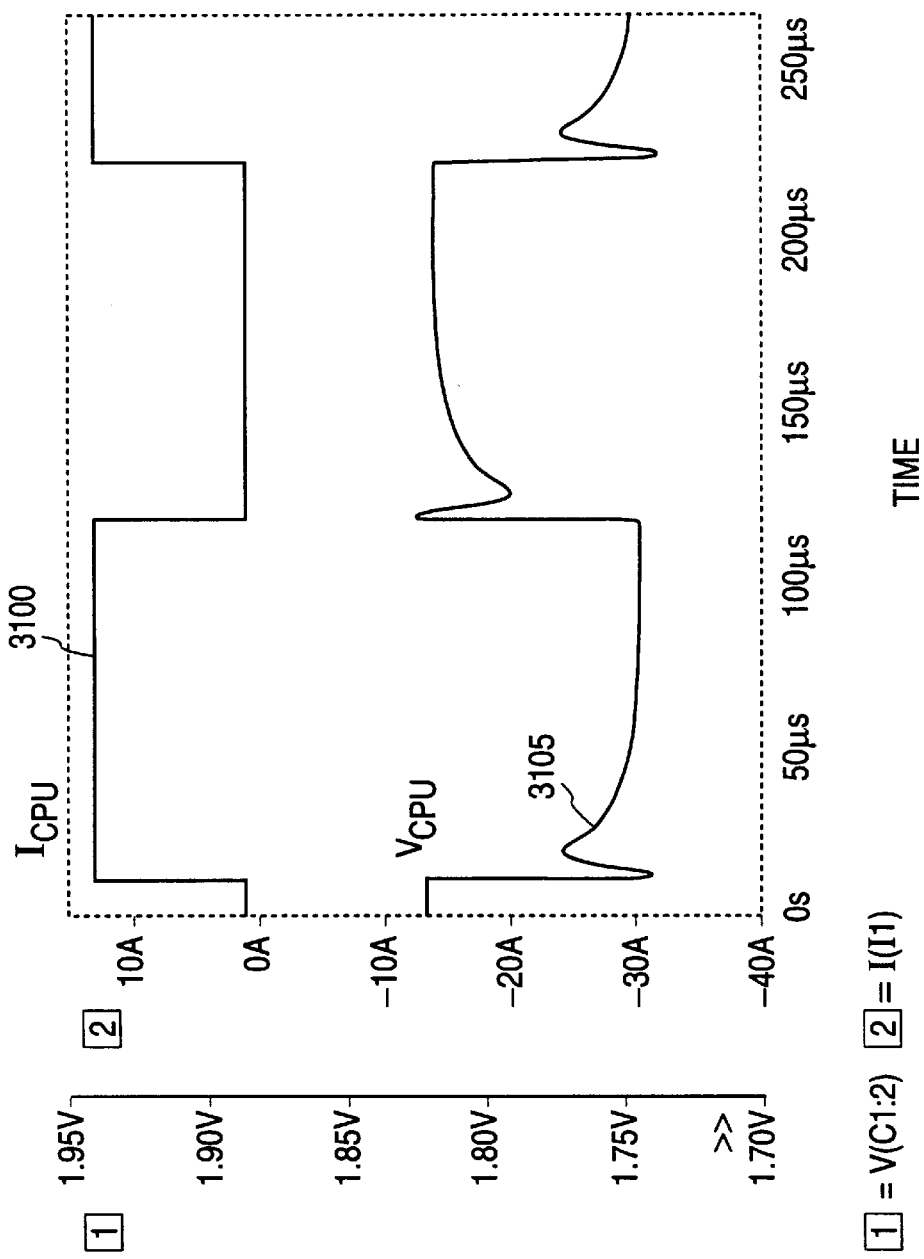
FIG. 31 is a graph of the current and voltage input into an IC chip versus time when using the conducting plates of the present invention to couple power from the power supply to an IC chip.

FIG. 30 shows a graph of the current and voltage input into an IC chip versus time when using power bars (round conductors) of the prior art to couple power from the power supply to the IC chip. In FIG. 30, graphs 3000 and 3005 represent the current input into the IC chip and the voltage of the IC chip, respectively, versus time. FIG. 31 shows a graph of the current and voltage input into an IC chip versus time when using conducting plates of the connector of the present invention to couple power from the power supply to the IC chip. In FIG. 31, graphs 3100 and 3105 represent the current input into the IC chip and the voltage of the IC chip, respectively, versus time. As seen in FIGS. 30 and 31, the voltage of the IC chip, particularly the transient voltage, is substantially lower when conducting plates rather than power bars are used. Computer simulations indicate that the use of conducting plates of the present invention instead of power bars or wires reduces inductance in the path to the IC chip by a factor of five from 60 nH to 12 nH. Thus, the conducting plates of the present invention provide a significant improvement over power bars or wires in regulating voltage at a high current demand IC chip such as a CPU.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

We claim:

1. A male connector for mating with a corresponding female connector having a plurality of conductors therein and coupled to a power supply, to transmit power from the power supply to a printed circuit (PC) board having a high current demand integrated circuit (IC) chip disposed thereon, said male connector comprising:

an insulating layer having a substantially uniform thickness and a first side and a substantially parallel second side;

a first electrically conductive plate being substantially planar along its length, said first electrically conductive plate having a top portion and a bottom portion, said first electrically conductive plate resting on said first side of said insulating layer along substantially the entire length of said insulating layer, said top portion of said first electrically conductive plate sized to contact a corresponding at least one conductor in said female connector;

first means for electrically coupling said first electrically conductive plate to the PC board, wherein said first means is coupled to the bottom of said bottom portion of said first electrically conductive plate;

a second electrically conductive plate, said second conductive plate being substantially planar along its length and substantially parallel to said first electrically conductive plate, said second electrically conductive plate having a top portion and a bottom portion, said second electrically conductive plate resting on said second side of said insulating layer along substantially the entire length of said insulating layer, said top portion of said second electrically conductive plate sized to contact a corresponding at least one conductor in said female connector;

second means for electrically coupling said second electrically conductive plate to the PC board, wherein said second means is coupled to the bottom of the bottom portion of said second electrically conductive plate; and an insulating body portion surrounding the exterior surfaces of the bottom portions of said fist electrically conductive plate and said second electrically conductive plate;

wherein the thickness of said insulating layer separating said first and said second conductive plates is selected to improve the transmission of power from the power supply via said conductive plates to said high current demand integrated circuit (IC) chip.

2. The male connector of claim 1, wherein said first means and said second means respectively comprise a first tongue and a second tongue extending out from the bottom of said body portion a predetermined amount so as to enable seating of said first tongue and said second tongue in corresponding slots in the PC board.

3. The male connector of claim 1, wherein said first means and said second means respectively comprise a first plurality of pins and a second plurality of pins extending out from the bottom of said body portion a predetermined amount so as to enable seating of said first plurality of pins and said second plurality of pins in corresponding pinholes in the PC board.

4. The male connector of claim 1, comprising:

at least one additional first electrically conductive plate, each said additional first electrically conductive plate having a top portion and a bottom portion, said top portion of each said additional first electrically conductive plate disposed on said first side of said insulating layer said top portion of each said additional first electrically conductive plate sized to contact a corresponding at least one conductor in said female connector;

first means for electrically coupling said at least one additional first electrically conductive plate to the PC board, wherein each said first means is coupled to the bottom of said bottom portion of a corresponding additional first conductive plate;

at least one additional second electrically conductive plate, each said additional second electrically conductive plate having a top portion and a bottom portion, said top portion of each said additional second electrically conductive plate disposed on said second side of said insulating layer, wherein each said additional second electrically conductive plate is substantially parallel to a corresponding additional first electrically conductive plate said top portion of each said additional second electrically conductive plate sized to contact a corresponding at least one conductor in said female connector; and second means for electrically coupling said at least one additional second electrically conductive plate to the PC board, wherein each said second means is coupled to the bottom of said bottom portion of a corresponding additional second conductive plate;

wherein said insulating body portion surrounds the exterior surface of the bottom portions of each said first additional first electrically conductive plate and each said second additional electrically conductive plate.

5. The male connector of claim 4 further comprising:

at least one control pin disposed on said first side of said insulating layer, each said control pin extending through the entire length of said body portion and protruding a predetermined amount outside said body portion so as to enable seating of said control pin into a corresponding pinhole in the PC board;

at least one control return pin disposed on said second side of said insulating layer, each said control return pin extending through the entire length of said body portion and protruding a predetermined amount outside said body portion so as to enable seating of said control return pin into a corresponding pinhole in the PC board.

6. The male connector of claim 1, wherein the thickness of said insulating layer and the width of the conductive plates is selected to reduce the inductance of said connector.

7. The male connector of claim 6, wherein the width of said conductive plates is selected to reduce both the high frequency resistance and the inductance of said male connector.

8. The male connector of claim 1, wherein the dielectric characteristics of said insulating layer, the thickness of said insulating layer, and the width of said conductive plates are selected to control the transmission line impedance of said male connector.

9. The male connector of claim 8, wherein said transmission line impedance of said male connector is selected to improve the coupling of power from the power supply to the IC.

10. The male connector of claim 9, wherein the thickness of said insulating layer, the width of said conductive plates, and the dielectric characteristics of said insulating layer are selected so that the transmission line impedance of said male connector is matched to the impedance of the IC.

11. The male connector of claim 9, wherein the thickness of said insulating layer, the width of said conductive plates, and the dielectric characteristics of said insulating layer are selected so that the transmission line impedance of said male connector is matched to the impedance of the power supply.

12. In an electrical system having a motherboard on which at least one integrated circuit (IC) chip is mounted, a mounting structure for coupling power from a power supply to a predetermined area on the motherboard adjacent the IC chip, said mounting structure comprising:

a frame;

a plurality of legs attached to the frame for supporting said frame on the motherboard, the ends of said legs opposite said frame being attached to the motherboard;

means for releasably fastening said power supply to said frame such that the power supply is positioned a predefined distance above the upper surface of the motherboard; and a male connector for mating with a corresponding female connector having a plurality of conductors therein and coupled to the power supply, for connecting the power output by the power supply to the motherboard at an area on the motherboard adjacent one or more high power demand IC chips, said male connector comprising:

an insulating layer having a substantially uniform thickness and a first side and a substantially parallel second side;

a first electrically conductive plate having a top portion and a bottom portion, said first electrically conductive plate disposed on said first side of said insulating layer, said top portion of said first electrically conductive plate sized to contact a corresponding at least one conductor in said female connector;

first means for electrically coupling said first electrically conductive plate to the PC board, wherein said first means is coupled to the bottom of said bottom portion of said first electrically conductive plate;

a second electrically conductive plate substantially parallel to said first electrically conductive plate, said second electrically conductive plate having a top portion and a bottom portion, said second electrically conductive plate disposed on said second side of said insulating layer, said top portion of said second electrically conductive plate sized to contact a corresponding at least one conductor in said female connector;

second means for electrically coupling said second electrically conductive plate to the PC board, wherein said second means is coupled to the bottom of the bottom portion of said second electrically conductive plate; and an insulating body portion surrounding the exterior surfaces of the bottom portions of said first electrically conductive plate and said second electrically conductive plate;

wherein the IC chip is powered by the power output of said power supply via said connector such that resistive losses and self-inductive effects in delivering power from said power supply to the IC chip are minimized.

13. The electrical system of claim 12, wherein said power supply is positioned above said motherboard and said male connector is positioned to reduce the electrical path length of power coupled by said connector from said power supply to said IC.

14. The electrical system of claim 13, wherein the dielectric characteristics of said insulating layer and the shape of said connector is selected so that the coupling of power from the power supply to the IC is improved.

15. The electrical system of claim 14, wherein the transmission line impedance of said male connector is impedance matched to said IC.

16. The electrical system of claim 15, wherein the transmission line impedance of said male connector is impedance matched to said power supply.

17. A power supply system for mounting on a motherboard on which at least one high current demand integrated circuit (IC) chip is mounted, said power supply system for coupling power to a predetermined area on the motherboard adjacent to the IC chip, said power supply system comprising:

a power supply; and a mounting structure upon which said power supply is releasably fastened by placing one end of said power supply on said mounting structure and rotating said power supply about an axis of rotation at said one end such that said power supply is lowered onto said mounting structure and releasably locked thereto, said mounting structure comprising:

a frame;

a plurality of legs attached to said frame for supporting said frame on the motherboard such that said power supply, when releasably locked to said mounting structure, is positioned a predefined distance above the upper surface of the motherboard, the ends of said legs opposite said frame being attached to the motherboard; and a connector for interconnecting said power supply and the motherboard, said connector comprising a male connector portion and a female connector portion, said male and female connector portions having a longitudinal plane of contact that is substantially perpendicular to said axis of rotation, said male connector portion comprising:

an insulating layer having a substantially uniform thickness and a first side and a substantially parallel second side;

a first electrically conductive plate having a top portion and a bottom portion, said first electrically conductive plate disposed on said first side of said insulating layer;

first means for electrically coupling said first electrically conductive plate to the PC board, wherein said first means is coupled to the bottom of said bottom portion of said first electrically conductive plate;

a second electrically conductive plate substantially parallel to said first electrically conductive plate, said second electrically conductive plate having a top portion and a bottom portion, said second electrically conductive plate disposed on said second side of said insulating layer;

second means for electrically coupling said second electrically conductive plate to the PC board, wherein said second means is coupled to the bottom of the bottom portion of said second electrically conductive plate; and an insulating male body portion surrounding the exterior surfaces of the bottom portions of said first electrically conductive plate and said second electrically conductive plate;

said female connector portion comprising:

a female body portion having a slot formed therein, said slot sized to enable said first and second conducting plates and said insulating layer to be releasably contained in said slot when said male and female connector portions are joined together;

a first conductor mounted in said slot so as to mate with said first electrically conductive plate when said male and female connector portions are joined together for electrically coupling said first electrically conductive plate to said power supply; and a second conductor mounted on said slot so as to mate with said second electrically conductive plate when said male and female connector portions are joined together for electrically coupling said second electrically conductive plate to said power supply;

wherein the IC chip is powered by the power output by said power supply via said connector such that resistive losses and self-inductance effects in delivering power from said power supply to the IC chip are minimized.

18. The power supply system of claim 17, wherein the dimensions of said conductive plates, the thickness of said insulating layer, and the dielectric characteristics of said insulating sheet are selected to improve the coupling of power from the power supply to the IC.

19. The power supply system of claim 18, wherein the transmission line impedance of said connector is impedance matched to said IC.

20. The power supply system of claim 18, wherein the transmission line impedance of said connector is impedance matched to said power supply.

* * * * *